US010356437B2

(12) United States Patent
Hashimoto et al.

(10) Patent No.: US 10,356,437 B2
(45) Date of Patent: Jul. 16, 2019

(54) MOVING IMAGE ENCODING APPARATUS INCLUDING PADDING PROCESSOR FOR ADDING PADDING DATA TO MOVING IMAGE AND OPERATION METHOD THEREOF

(71) Applicant: Renesas Electronics Corporation, Koutou-ku, Tokyo (JP)

(72) Inventors: Ryoji Hashimoto, Tokyo (JP); Kenichi Iwata, Tokyo (JP); Kazushi Akie, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 478 days.

(21) Appl. No.: 14/906,901

(22) PCT Filed: Jul. 22, 2013

(86) PCT No.: PCT/JP2013/069753
§ 371 (c)(1),
(2) Date: Jan. 21, 2016

(87) PCT Pub. No.: WO2015/011752
PCT Pub. Date: Jan. 29, 2015

(65) Prior Publication Data
US 2016/0156926 A1 Jun. 2, 2016

(51) Int. Cl.
*H04N 19/563* (2014.01)
*H04N 19/61* (2014.01)
(Continued)

(52) U.S. Cl.
CPC .......... *H04N 19/563* (2014.11); *H04N 19/11* (2014.11); *H04N 19/115* (2014.11);
(Continued)

(58) Field of Classification Search
None
See application file for complete search history.

(56) References Cited

U.S. PATENT DOCUMENTS

| 2006/0072669 A1 | 4/2006 | Lin et al. |
| 2007/0098071 A1* | 5/2007 | Ohgose .................. H04N 19/61 |
| | | 375/240.12 |

(Continued)

FOREIGN PATENT DOCUMENTS

| CN | 101969562 A | 2/2011 |
| JP | 05-091333 A | 4/1993 |

(Continued)

OTHER PUBLICATIONS

Jeon et al., "Video coding technology proposal by LG Electronics", JCT-VC Meeting; Apr. 15, 2010-Apr. 23, 2010; Dresden; (Joint Collaborative Team on Video Coding ISO/IEC JTC1/SC29/WG11 and ITU-TSG 16); No. JCTVC-A110, Apr. 13, 2010 (Apr. 13, 2010), XP030007545, ISSN: 0000-0049.*

(Continued)

*Primary Examiner* — William C Vaughn, Jr.
*Assistant Examiner* — Stuart D Bennett
(74) *Attorney, Agent, or Firm* — Shapiro, Gabor and Rosenberger, PLLC

(57) ABSTRACT

A moving image encoding apparatus executes moving image encoding of a syntax element relating to a moving image signal VS to form an encoded bitstream CVBS. Padding processing of adding padding processing data PD to the moving image signal VS is executed prior to the moving image encoding. Then it is determined whether the encoded block of the syntax element belongs to the moving image signal VS or the padding processing data PD. In the case that the encoded block belongs to the former, an encoded bitstream having a large code amount is formed. In the case (Continued)

where the encoded block belongs to the latter, an encoded bitstream having a small code amount is formed.

15 Claims, 10 Drawing Sheets

(51) Int. Cl.
| | |
|---|---|
| *H04N 19/59* | (2014.01) |
| *H04N 19/115* | (2014.01) |
| *H04N 19/119* | (2014.01) |
| *H04N 19/159* | (2014.01) |
| *H04N 19/42* | (2014.01) |
| *H04N 19/52* | (2014.01) |
| *H04N 19/86* | (2014.01) |
| *H04N 19/91* | (2014.01) |
| *H04N 19/176* | (2014.01) |
| *H04N 19/11* | (2014.01) |
| *H04N 19/132* | (2014.01) |
| *H04N 19/167* | (2014.01) |
| *H04N 19/146* | (2014.01) |
| *H04N 19/124* | (2014.01) |
| *H04N 19/436* | (2014.01) |

(52) U.S. Cl.
CPC ......... *H04N 19/119* (2014.11); *H04N 19/132* (2014.11); *H04N 19/159* (2014.11); *H04N 19/167* (2014.11); *H04N 19/176* (2014.11); *H04N 19/42* (2014.11); *H04N 19/52* (2014.11); *H04N 19/59* (2014.11); *H04N 19/61* (2014.11); *H04N 19/86* (2014.11); *H04N 19/91* (2014.11); *H04N 19/124* (2014.11); *H04N 19/146* (2014.11); *H04N 19/436* (2014.11)

(56) References Cited

U.S. PATENT DOCUMENTS

| | | | |
|---|---|---|---|
| 2011/0135000 A1 | 6/2011 | Alshina et al. | |
| 2012/0093234 A1* | 4/2012 | Rosenzweig | G06F 15/8007 375/240.24 |
| 2012/0106652 A1 | 5/2012 | Huang et al. | |
| 2012/0195378 A1* | 8/2012 | Zheng | H04N 19/105 375/240.12 |
| 2012/0237132 A1* | 9/2012 | Kihara | H04N 19/61 382/232 |
| 2012/0320970 A1 | 12/2012 | Drugeon et al. | |
| 2013/0028326 A1 | 1/2013 | Moriya et al. | |

FOREIGN PATENT DOCUMENTS

| | | | |
|---|---|---|---|
| JP | 07-203434 A | | 8/1995 |
| JP | 09-322164 A | | 12/1997 |
| JP | 9322164 A1 | * | 12/1997 |
| JP | 10-023404 A | | 1/1998 |
| JP | 2002-051338 A | | 2/2002 |
| JP | 2007-124564 A | | 5/2007 |
| JP | 2009-100041 A | | 5/2009 |
| JP | 2010-193401 A | | 9/2010 |
| JP | 2012-195702 A | | 10/2012 |
| WO | WO2011/125313 A1 | | 10/2011 |
| WO | WO 2012-169184 A1 | | 12/2012 |

OTHER PUBLICATIONS

Jeon et al., "Video coding technology proposal by LG Electronics", JCT-VC Meeting; Apr. 15, 2010-Apr. 23, 2010; Dresden; (Joint Collaborative Team on Video Coding ISO/IEC JTC1/SC29/WG11 and ITU-TSG 16); No. JCTVC-A110, Apr. 13, 2010 (Apr. 13, 2010), XP030007545, ISSN: 0000-0049 (Year: 2010).*

Yang et al., "CTB splitting on frame boundary for arbitrary resolution video," Joint Collaborative Team on Video Coding (JCT-VC) of ITU-T SG16 WP3 and ISO/IEC JTC1/SC29/WG11, 3$^{rd}$ Meeting, Oct. 1, 2010.

Hashimoto et al., "A hardware oriented implementation of HEVC encoding," Joint Collaborative Team on Video Coding (JCT-VC) of ITU-T SG16 WP3 and ISO/IEC JTC1/SC29/WG11, 14$^{th}$ Meeting, Jul. 16, 2013.

Jeon, et al. "Description of video coding technology proposal by LG Electronics," Joint Collaborative Team on Video Coding (JCT-VC) of ITU-T SG16 WP3 and ISO/IEC JTC1/SC29/WG11, 1$^{st}$ Meeting, Apr. 13, 2010.

Extended European Search Report dated Mar. 6, 2017, in European Patent Application No. 13889853.1.

B. Jeon et al., "Description of Video coding technology proposal by LG Electronics", Joint Collaborative Team on Video Coding (JCT-TV) of ITU-T SG16 WP3 and ISO/IEC JTC1/SC29/WG11, 1$^{st}$ Meeting, Dresden, Germany, Apr. 15-23, 2010.

Office Action dated Nov. 17, 2016, in Japanese Patent Application No. 2015-528022.

Office Action dated Jul. 28, 2016, in Japanese Patent Application No. 2015-528022.

European Office Action dated Jan. 23, 2018, in European Application No. 13889853.1.

Gary J. Sullivan et al, "Overview of the High Efficiency Video Coding (HEVC) Standard", IEEE Transactions on Circuits and Systems for Video Technology, vol. 22, No. 12, Dec. 2012, pp. 1649-1668.

Gary J. Sullivan et al, "Video Compression-From Concept to the H. 264/AVC Standard", Proceeding of the IEEE, vol. 93, No. 1, Jan. 2005, pp. 18-31.

International Search Report from International Patent Application No. PCT/JP2013/069753, dated Oct. 15, 2013.

* cited by examiner

MOVING IMAGE ENCODING APPARATUS INCLUDING PADDING PROCESSOR FOR ADDING PADDING DATA TO MOVING IMAGE AND OPERATION METHOD THEREOF

TECHNICAL FIELD

The present invention relates to a moving image encoding apparatus and an operation method thereof, and particularly to, a technology effective for reducing an increase in a code amount of an encoded bitstream that is generated from the moving image encoding apparatus during padding processing.

BACKGROUND ART

As is well known, a typical compression scheme of a moving image (moving picture) in accordance with the standard of MPEG-2 standardized with international standard ISO/IEC 13818-2 is based on a principle of reducing a video storage capacity and a necessary bandwidth by deleting redundant information from a video stream. In addition, MPEG is an abbreviation of Moving Picture Experts Group.

The standard of MPEG-2 defines only bitstream syntax (a rule of a compressed and encoded data row, or a method of constructing a bitstream of encoded data), and a decoding process. Accordingly, the MPEG-2 standard is flexible enough to use in various situations such as satellite broadcasting services, cable television, interactive television, and the Internet.

In an encoding process of MPEG-2, video signals are sampled and quantized so as to initially define color and brightness components of each pixel of a digital video. Values which represent the color and brightness components are stored in a structure that is known as a macro block. The values of the color and the brightness which are accumulated in the macro block are transformed to frequency values by using discrete cosine transform (DCT). Transform coefficients obtained by DCT have frequencies different from each other in accordance with the brightness and the color of a picture. Quantized DCT transform coefficients are encoded in accordance with variable length coding (VLC) that is configured to further compress video streams.

In the encode process of MPEG-2, additional compression in accordance with a motion compression scheme is defined. In the standard of MPEG-2, three kinds of pictures or frames such as an I frame, a P frame, and a B frame exist. The I frame is an intra-encoded frame which is reproduced without reference to other pictures or frames in a video stream. The P frame and the B frame are inter-encoded frames which are reproduced with reference to other pictures or frames. For example, the P frame and the B frame include a motion vector which represents motion estimation relating to a reference frame. When using the motion vector, an MPEG encoder can reduce a bandwidth necessary for a specific video stream. In addition, the I frame is referred to as an independent (intra-coded) frame, the P frame is referred to as a unidirectional prediction (predictive-coded) frame, and the B frame is referred to as a bidirectional prediction (bi-directionally predictive-coded) frame.

Accordingly, a moving image encoding apparatus (encoder) of MPEG-2 includes a frame memory, a motion vector detection unit, a motion compensation unit, a subtraction unit, a DCT transform unit, a quantization unit, an inverse quantization unit, an inverse DCT transform unit, and a variable length encoding unit. A moving image signal that is encoded is stored in the frame memory for encoding of the B frame or detection of the motion vector, and is read out from the frame memory. From the moving image signal, a motion compensation prediction signal transmitted from the motion compensation unit is subtracted in the subtraction unit, and the resultant moving image signal is subjected to DCT transform processing and quantization processing in the DCT transform unit and the quantization unit, respectively. A DCT transform coefficient, which is quantized, is subjected to variable length encoding processing in the variable length encoding unit, and local decoding processing in the inverse quantization unit and the inverse DCT transform unit. Then, the local decoding processing result is supplied to the subtraction unit through the motion compensation unit.

On the other hand, a moving image decoding apparatus (decoder) of MPEG-2 includes a buffer memory, a variable length decoding unit, an inverse quantization unit, an inverse DCT transform unit, a motion compensation unit, an addition unit, and a frame memory. An encoded bitstream of MPEG-2 is stored in the buffer memory, and is subjected to variable length decoding processing, inverse quantization processing, and inverse DCT transform processing in the variable length decoding unit, the inverse quantization unit, and the inverse DCT transform unit, respectively. The resultant processing results are added to a reference image that is generated on the basis of a motion vector that is subjected to variable length decoding processing in the addition unit, and thus a regeneration image signal is generated from an output from the addition unit. The regeneration image signal is stored in the frame memory, and is used for prediction of another frame.

Subsequently to the standard of MPEG-2, there is suggested a typical compression scheme of a moving image in accordance with standard (H. 263) of MPEG-4 standardized with the international standard ISO/IEC 14496 for low-rate encoding in a television telephone and the like. The compression scheme in accordance with the standard of MPEG-4 (H. 263) is referred to as "a hybrid type" that uses inter-frame prediction and discrete cosine transform similar to MPEG-2, and motion compensation in a half-pixel (half-pel) unit is additionally introduced to the compression scheme. The compression scheme uses a Huffman code as entropy encoding similar to MPEG-2, and a three-dimensional variable length encoding (three-dimensional VLC) technology of simultaneously encoding run, level, and last is additionally introduced, thereby greatly improving a compression ratio. In addition, the run and level relate to a coefficient of a run-length, and the last represents a final coefficient. Additionally, the standard of MPEG-4 (H. 263) includes a base portion that is referred to as Baseline, and an expansion standard that is referred to as Annex.

An efficiency improvement by the compression scheme in accordance with the standard of MPEG-4 (H. 263) is not sufficient, and thus the standard of MPEG-4 AVC (H. 264) is standardized in accordance with the international standard ISO/IEC 14496-10 so as to accomplish relatively higher encoding efficiency. In addition, AVC is an abbreviation of Advanced Video Coding, and the standard of MPEG-4 AVC (H. 264) is referred to as H. 264/AVC.

Video coding in accordance with the standard H. 246/AVC is constituted by a video coding layer, and a network abstraction layer. That is, the video coding layer is designed to effectively express video context, and the network abstraction layer formats VCL expression of a video, and applies header information by using an appropriate method for transmission with various transmission layers or storage mediums.

In the international standard moving image encoding methods such as MPEG-2, MPEG-4, and MPEG-4 AVC (H. 264), inter-encoding, that is, inter-frame prediction encoding is used to realize high encoding efficiency by using correlation in a time direction. A frame encoding mode includes an I frame that uses intra-encoding without using correlation between frames, a P frame that performs inter-prediction from one frame that was encoded in the past, and a B frame that can perform inter-prediction from two frames which were encoded in the past.

In the inter-frame prediction encoding, subtraction between a moving image that is a target to be encoded and a reference image (prediction image) that is subjected to motion compensation is executed, and thus a predictive residual resulting from the subtraction is encoded. The encoding processing includes orthogonal transform such as discrete cosine transform (DCT), quantization, and variable length encoding processing. The motion compensation (motion correction) includes a process of spatially moving a reference frame for inter-frame prediction, and the motion compensation processing is executed in a block unit of a frame to be encoded. In a case where motion is not present in image content, a pixel at the same position as the pixel to be predicted is used without movement. In a case where motion is present, the most similar block is searched, and a movement amount is set as a motion vector. A motion compensation block is a block of 16 pixels×16 pixels or 16 pixels×8 pixels in the encoding method of MPEG-2, and is a block of 16 pixels×16 pixels, 16 pixels×8 pixels, or 8 pixels×8 pixels in the encoding method of MPEG-4. The motion compensation block is a block of 16 pixels×16 pixels, 16 pixels×8 pixels, 8 pixels×16 pixels, 8 pixels×8 pixels, 8 pixels×4 pixels, 4 pixels×8 pixels, or 4 pixels×4 pixels in the encoding method of MPEG-4 AVC (H. 264).

The above-described encoding processing is executed for each video screen (frame or field), and a block, in which the screen is subdivided (typically, 16 pixels×16 pixels, and the block is referred to as a macro block (MB) in MPEG), becomes a processing unit. That is, the most similar block (prediction image) is selected from reference images, which are encoded already, for each block to be encoded, and a difference signal between an encoded image (block) and a prediction image is encoded (through orthogonal transform, quantization, or the like). A difference in a relative position between a block to be encoded in a screen, and a prediction signal is referred to as a "motion vector".

In addition, NPL 1 discloses that the video coding layer (VCL) in accordance with H. 246/AVC follows an approach that is called block-based hybrid video coding. VCL design includes a macro block and a slice. Each picture is divided into a plurality of macro blocks having a fixed size, and each of the macro blocks includes quadrangular picture areas of 16 samples×16 samples in terms of luminance components, and a quadrangular sample area in each of two color difference components which correspond to the quadrangular picture areas. One picture may include one or more slices. Each of the slices is self-inclusive in the meaning of applying an active sequence parameter set and a picture parameter set. Basically, slice expression can be decoded without using information from other slices, and thus a syntax element can be analyzed from a bitstream and a value of a sample of a picture area. However, when applying a deblocking filter over a slice boundary for more perfect decoding, several pieces of information from other slices are necessary.

On the other hand, with regard to a moving image code handling system, in a digital high definition television (HDTV) broadcasting receiver, a digital video camera capable of capturing an image in terms of an HDTV signal, and the like, an image size increases. In an image encoding apparatus or an image decoding apparatus which processes the signals, there is a demand for higher processing performance.

From this kind of circumstance, a new standard H.265 (ISO/IEC 23008-2) that is a standard subsequent to the standard H. 264/MPEG-4 AVC is suggested, and the new standard is referred to as high efficiency video coding (HEVC). It is said that the HEVC standard has excellent compression efficiency due to optimization of a block size and the like, and the HEVC standard has compression performance four times that of the standard of the MPEG-2, and compression performance two times that of the standard H. 264/AVC.

On the other hand, PTL 1 discloses that in various widely employed encoding compression standards such as MPEG-1/2/4, and H. 261/H. 263/H. 264-AVC, one macro block of 16 pixels×16 pixels is used as a processing unit in the motion compensation and the subsequent processing, but in the HEVC standard, a more flexible block structure is employed as a processing unit. The unit of the flexible block structure is referred to as a coding unit (CU), and the coding unit is adaptively divided into a small block using quadtree so as to accomplish satisfactory performance starting from the largest coding unit (LCU). The size of the largest coding unit (LCU) is 64 pixels×64 pixels which is significantly greater than the size (16 pixels×16 pixels) of the macro block. In addition, the largest coding unit (LCU), which is described in PTL 1, corresponds to a coding tree block (CTB) or a coding tree unit (CTU) which is described in the HEVC standard.

An example of coding unit division based on the quadtree is illustrated in FIG. 1 and description relating to FIG. 1 in PTL 1, and at a depth of "zero", a first coding unit (CU) is the largest coding unit (LCU) of 64 pixels×64 pixels. A split flag "0" represents that the coding unit (CU) at that point of time is not split. In contrast, a split flag "1" represents that the coding unit (CU) at that point of time is divided into four small coding units by the quadtree. PTL 1 also describes that the coding unit (CU) after division is additionally quadtree-divided until reaching the size of a minimum coding unit (CU) which is specified in advance.

NPL 2 describes an outline of the standard of HEVC. A core of a coding layer in a previous standard is a macro block including 16 blocks×16 blocks of luminance samples, and two chromaticity samples of 8 blocks×8 blocks. In contrast, a similar configuration of the standard of HEVC is a coding tree unit (CTU) which is larger than a typical macro block and of which a size is selected by an encoder. The coding tree unit (CTU) includes a luminance coding tree block (CTB), a chromaticity coding tree block (CTB), and a syntax element. The quadtree syntax of the coding tree unit (CTU) designates the size and position of the coding tree block (CTB) of the luminance and the chromaticity. Whether or not to use an inter-picture or an intra-picture for encoding of a picture area is determined in accordance with a level of the coding unit (CU). A division structure of a prediction unit (PU) is based on the level of the coding unit (CU). Size division of the coding block (CB) of the luminance and the chromaticity is possible depending on determination of a basic prediction type, and can be predicted from a prediction block (PB) of luminance and chromaticity. The HEVC standard supports a size of a prediction block (PB) that is variable from 64 samples×64 samples to 4 samples×4 samples. A predictive residual is encoded by block transform, and a tree structure of a transform unit (TU) is based on the level of the coding unit (CU). A residual difference of the coding block (CB) of luminance can be made to be equal to that of the transform block (TB) of luminance, and can be divided to a transform block (TB) of less luminance. This is true of the transform block (TB) of chromaticity. An integer-base function, which is similar to a function of discrete cosine transform (DCT), is defined for the size of a quadrangular transform block (TB) of 4 samples×4 samples, 8 samples×8 samples, 16 samples×16 samples, and 32 samples×32 samples.

In addition, NPL 2 describes a configuration of a hybrid video encoder capable of generating a bitstream conforming to the standard of HEVC, and also describes that a deblocking filter similar to a deblocking filter, which is used in the standard of H.264/MPEG-4 AVC, is included in an inter-picture prediction loop.

PTL 2 describes a configuration in which shape information of an image signal input from an outer side is supplied to a padding unit, which fills an empty area having no image data in a block, so as to effectively encode an image having an arbitrary shape. It is necessary for the horizontal and vertical sizes of the input image signal to be an integral multiple of a block size for compression encoding, and thus the padding unit executes an operation of filling the empty area with an average value of an image area, or an operation of filling the empty area by copying an end pixel of the image area so as to encode an image having an arbitrary shape.

PTL 3 describes an encoding apparatus solving a problem in which when encoding a signal of which a pixel value discontinuously varies at an end portion of a screen in the case of encoding of an image signal, a high-frequency component occurs due to discontinuity of the signal, and thus a lot of code amount occurs. A weight coefficient determination unit calculates a position of an image signal on a screen on the basis of a synchronization signal, and outputs a weight coefficient w that is close to 0 as it approaches the end of the screen. A first multiplier multiplies the input image signal by the weight coefficient w, a second multiplier multiplies an output of a constant-value output unit by a coefficient 1−w, and an adder adds output signals of the two multipliers. Then, an output of the adder is encoded by an encoder. PTL 3 describes that the image signal is smoothly set to a constant value at the end of the screen, and thus a surplus code amount is not necessary.

PTL 4 describes a television telephone apparatus. In the television telephone apparatus, when information indicating an important image position, which is included in transmission images, is set in an operation unit by an operator, an image encoding unit executes encoding in such a manner that image quality of image data in the important image position is further improved in comparison to image data in other positions.

PTL 5 describes padding processing of extrapolating a pixel value in a screen to an outer side of the screen so as to realize a motion vector (unrestricted motion vector (UMV)) on an outer side of the screen which is employed in the standard of MPEG-4 (so as to use an outer side of the screen as a reference image). In addition, PTL 5 discloses a method of preventing noise that occurs in a decoder in a case where whether an extrapolation initiation position in the padding processing is an end of an effective image area or an end of an encoded macro block is not unified by the MPEG-4 standard, and thus the extrapolation initiation position in the padding processing is not unified between an encoder and a decoder.

CITATION LIST

Patent Literature

[PTL 1] US Unexamined Patent Application Publication No. US2012/0106652 A1
[PTL 2] JP-A-10-23404
[PTL 3] JP-A-5-91333
[PTL 4] JP-A-7-203434
[PTL 5] JP-A-2009-100041

Non-Patent Literature

[NPL 1] GARY J. SULLIVAN et al, "Video Compression-From Concept to the H. 264/AVC Standard", PROCEEDING OF THE IEEE, VOL. 93, No. 1, January 2005, PP. 18-31.
[NPL 2] Gary J. Sullivan et al, "Overview of the High Efficiency Video Coding (HEVC) Standard", IEEE TRANSACTIONS ON CIRCUITS AND SYSTEMS FOR VIDEO TECHNOLOGY, VOL. 22, NO. 12, December 2012, PP. 1649-1668.

DISCLOSURE OF THE INVENTION

Problems that the Invention is to Solve

Prior to the invention, the present inventors, work has been engaged in the development of a moving image encoding apparatus (video encoder) capable of generating an encoded bitstream through encoding of a moving image input signal in conformity with an HEVC standard as a standard subsequent to a current standard H. 264/MPEG-4 AVC. In the moving image encoding apparatus, there is a demand for encoding of a moving image input signal in conformity with not only the HEVC standard but also the current standard H. 264/MPEG-4 AVC.

It is said that the HEVC standard has excellent compression efficiency due to optimization of a block size and the like, and the HEVC standard has compression performance four times that of the standard of the MPEG-2, and compression performance two times that of the standard H. 264/AVC. Further higher processing performance is demanded for the moving image encoding apparatus or the moving image decoding apparatus in accordance with an increase in an image size in a digital high definition television (HDTV) broadcasting receiver, a digital video camera capable of capturing an image in terms of an HDTV signal, and the like, and thus it is expected that the HEVC standard satisfies the demands.

On the other hand, recently, 4KTV, which includes a display device having a pixel size of 4096 pixels×2160 pixels or 3840 pixels×2160 pixels which is approximately four times the pixel size (1920 pixels×1080 pixels) of high definition (HD), has attracted attention. For example, in Japan, Ministry of Internal Affairs and Communications has announced a plan to initiate 4K television broadcasting from July, 2014. As described above, higher processing performance is also demanded for the moving image encoding apparatus or the moving image decoding apparatus which executes encoding or decoding of a moving image signal of one sheet of a frame (picture) corresponding to a display screen of a display device of the 4KTV.

FIG. 10 is a diagram illustrating a configuration of a moving image encoding apparatus 1 capable of generating an encoded bitstream through encoding of a moving image input signal in conformity with a type selected between the current standard H. 264 and the HEVC standard which are examined by the present inventors prior to the invention.

The moving image encoding apparatus 1 illustrated in FIG. 10 includes a padding processing unit 100, a subtractor 101, a frequency transform unit 102, a quantization unit 103, an inverse quantization unit 104, an inverse frequency transform unit 105, an adder 106, a variable length encoding unit 114, and a video buffer 115. In addition, the moving image encoding apparatus 1 includes a filter unit 107, a frame memory 108, a motion vector detection unit 109, a motion compensation unit 110, a buffer memory 111, an intra-prediction unit 112, and a selector unit 113.

A moving image signal VS is supplied to an input terminal of the padding processing unit 100, and the padding processing unit 100 executes padding processing as necessary. That is, as described in PTL 2, in a case where the horizontal and vertical sizes of the moving image signal VS, which is supplied to the moving image encoding apparatus 1, are not an integral multiple of an encoded block size, the padding processing unit 100 executes the padding processing so that the horizontal and vertical sizes of the moving image signal after the padding processing become an integral multiple of the encoded block size.

FIG. 11 is a diagram illustrating the padding processing in the padding processing unit 100 of the moving image encoding apparatus 1 illustrated in FIG. 10 which is examined by the present inventors prior to the invention.

FIG. 11 illustrates a case where the moving image encoding apparatus 1 illustrated in FIG. 10 executes encoding processing of the moving image signal VS in conformity with the HEVC standard. That is, an encoded block size in this case is a coding unit CU that is defined in accordance with the HEVC standard. Accordingly, the coding unit CU includes a largest coding unit (LCU) of 64 pixels×64 pixels, and a coding unit that is generated through splitting of the largest coding unit (LCU).

As illustrated in FIG. 11, the horizontal and vertical sizes of the moving image signal VS, which is supplied to the moving image encoding apparatus 1, are not set to an integral multiple of the coding unit CU that is an encoded block size. Accordingly, the padding processing unit 100 executes the padding processing so that the horizontal and vertical sizes of the moving image signal after the padding processing become an integral multiple of the encoded block size. That is, as illustrated in FIG. 11, padding processing data PD is added to the moving image signal VS in a right horizontal direction and a vertical lower direction thereof through the padding processing by the padding processing unit 100. For example, the padding processing data PD can be formed by copying pixel values of the moving image signal VS in the vicinity of a boundary between the moving image signal VS and the padding processing data PD, or an average value of the pixel values. As a result, since the padding processing data PD is added to the moving image signal VS so that the horizontal and vertical sizes of the moving image signal after the padding processing become an integral multiple of the encoding block size, it is possible to reduce a high-frequency component that occurs due to discontinuity of the moving image signal during encoding processing of a moving image by the moving image encoding apparatus 1 illustrated in FIG. 10. Accordingly, through a reduction in a high-frequency component, it is possible to reduce a code amount of a compressed video encoded bitstream CVBS that is generated from the variable length encoding unit 114.

In addition, it is necessary for the moving image signal VS after the padding processing by the padding processing unit 100 illustrated in FIG. 11 to be displayed by a moving image decoding apparatus (decoder). In contrast, it is not necessary for the padding processing data PD after the padding processing by the padding processing unit 100 illustrated in FIG. 11 to be displayed by the moving image decoding apparatus (decoder).

In addition, in a case where the moving image encoding apparatus 1 illustrated in FIG. 10 executes the encoding processing of the moving image signal VS in conformity with the current standard H. 264, the encoded block size becomes a macro block (MB). The macro block (MB) has a size of 16 pixels×16 pixels in terms of a luminance component. In this case, the padding processing unit 100 executes the padding processing so that the horizontal and vertical sizes of the moving image signal after the padding processing become an integral multiple of the macro block (MB) size.

As illustrated in FIG. 10, an additional moving image signal VS+PD after the padding processing by the padding processing unit 100 is supplied to one input terminal of the subtractor 101, one input terminal of the motion vector detection unit 109, and one input terminal of the intra-prediction unit 112.

Although not illustrated in FIG. 10, a prediction mode, which represents inter-prediction or intra-prediction of each picture of a moving image, is supplied from an encoding control unit (not illustrated) to the selector unit 113 and the variable length encoding unit 114. First, the coding unit (CU) of the moving image signal VS that is inter-encoded is supplied to one input terminal of the subtractor 101. On the other hand, the motion vector detection unit 109 generates a motion vector MV in response to the moving image signal VS after the padding processing which is transmitted from the padding processing unit 100, and a reference image that is stored in the frame memory 108. In addition, the motion compensation unit 110 generates a motion compensation prediction signal in response to the motion vector MV that is generated, and the reference image that is stored in the frame memory 108. As a result, the motion compensation prediction signal that is transmitted from the motion compensation unit 110 is subtracted from the moving image signal VS in the subtraction unit 101 through the selector unit 113. Frequency transform processing and quantization processing are executed with respect to a predictive residual that is a subtraction output signal from the subtraction unit 101 in the frequency transform unit 102 and the quantization unit 103, respectively. A frequency transform coefficient that is quantized in the quantization unit 103, and the motion vector MV that is generated from the motion vector detection unit 109 are subjected to variable length encoding processing in the variable length encoding unit 114, and a compressed video encoded bitstream CVBS is generated through the video buffer 115. On the other hand, the frequency transform coefficient that is quantized in the quantization unit 103 is subjected to local decoding processing by the inverse quantization unit 104, the inverse frequency transform unit 105, the adder 106, and the filter unit 107, and a local decoding processing result is stored in the frame memory 108 as a reference image. The filter unit 107 has a deblocking filter function of reducing block distortion in accordance with the standard of MPEG-4 AVC (H. 264). In addition, the filter unit 107 further has a filter function called sample adaptive offset (SAO) after the deblocking filter processing so as to conform to the HEVC standard. The filter function is configured to satisfactorily reconstruct an original signal amplitude by using a look-up table that is described by an additional parameter determined through frequency distribution analysis by an encoding control unit (not illustrated) of the moving image encoding apparatus 1.

With regard to the intra-encoding of the moving image signal, the moving image signal VS after the padding processing which is transmitted from the padding processing unit 100 is supplied to one input terminal of the intra-prediction unit 112. The reference image, which is encoded through the intra-prediction and is generated through the local decoding processing, is stored in the buffer memory 111, and thus the reference image readout from the buffer memory 111 is supplied to the other input terminal of the intra-prediction unit 112. Accordingly, in the case of the intra-encoding of the coding unit (CU) of the moving image signal VS that is supplied to one input terminal, the intra-prediction unit 112 selects an optimal coding unit among a plurality of adjacent coding units (CU) included in the reference image which is supplied from the buffer memory 111 to the other input terminal and of which encoding is completed, and generates spatial information of the optimal coding unit that is selected. As a result, the intra-prediction unit 112 supplies intra-prediction information including a spatial prediction mode, which corresponds to the intra-predicted optimal coding unit (CU), to the selector unit 113.

As described above, in the moving image encoding apparatus 1 illustrated in FIG. 10 which is examined by the present inventor prior to the invention, the padding processing unit 100 executes the padding processing so that the horizontal and vertical sizes of an additional moving image signal VS+PD after the padding processing become an integral multiple of the encoded block size. Accordingly, even in a case where the horizontal and vertical sizes of the moving image signal VS, which is supplied to the moving image encoding apparatus 1, are not an integral multiple of the encoded block size, the padding processing data PD is added, and thus it is possible to reduce a high-frequency component that occurs due to discontinuity of the moving image signal. Accordingly, it is possible to reduce a code amount of the compressed video encoded bitstream CVBS that is generated from the variable length encoding unit 114 due to the reduction in the high-frequency component.

The moving image encoding apparatus 1 illustrated in FIG. 10 can reduce the code amount of the encoded bitstream CVBS by reducing the high-frequency component, which occurs due to the discontinuity of the moving image signal, through the padding processing by the padding processing unit 100. However, through an examination prior to the invention, the present inventors have found a problem in that the code amount of the encoded bitstream CVBS increases by an amount corresponding to the padding processing data PD that is added to the moving image signal VS.

That is, as described above, for example, the padding processing data PD, which is added to the moving image signal VS, is formed by copying pixel values of the moving image signal VS in the vicinity of a boundary between the moving image signal VS and the padding processing data PD, or an average value of the pixel values. As a result, the pixel values of the padding processing data PD become a non-zero value. Accordingly, the padding processing data PD is also encoded, and thus the encoding bitstream CVBS also includes data different from the moving image signal VS. Therefore, the code amount of the encoded bitstream CVBS increases.

Hereinafter, description will be given of means for solving the above-described problem, and other objects and new characteristics will be more apparent from the description of this application and the accompanying drawings.

Means for Solving the Problems

The representative configurations of the invention that is disclosed in this application are as follows.

That is, according to a representative embodiment, there is provided a moving image encoding apparatus (1) that executes moving image encoding processing of a syntax element relating to a moving image signal (VS) that is to be encoded to form an encoded bitstream (CVBS).

The moving image encoding apparatus (1) executes padding processing (100) of adding padding processing data (PD) to the moving image signal (VS) prior to the moving image encoding processing.

The horizontal and vertical sizes of an additional moving image signal, to which the padding processing data (PD) is added through the padding processing, are set to an integral multiple of an encoded block size in the moving image encoding processing.

The moving image encoding apparatus (1) determines to which of the moving image signal (VS) and the padding processing data (PD) an encoded block of the syntax element belongs.

In a first case where the encoded block of the syntax element is determined as belonging to the moving image signal, the moving image encoding processing is controlled so that the encoded bitstream having a first code amount is formed.

In a second case where the encoded block of the syntax element is determined as belonging to the padding processing data, the moving image encoding processing is controlled so that the encoded bitstream having a second code amount smaller than the first code amount is formed (refer to FIG. 1).

Effects of the Invention

Hereinafter, an effect, which is obtained by the representative invention disclosed in this application, will be briefly described.

That is, according to the moving image encoding apparatus of the invention, it is possible to reduce an increase in a code amount of an encoded bitstream that is generated from the moving image encoding apparatus during padding processing.

DESCRIPTION OF EMBODIMENTS

1. Summary of the Embodiments

Figure 1:
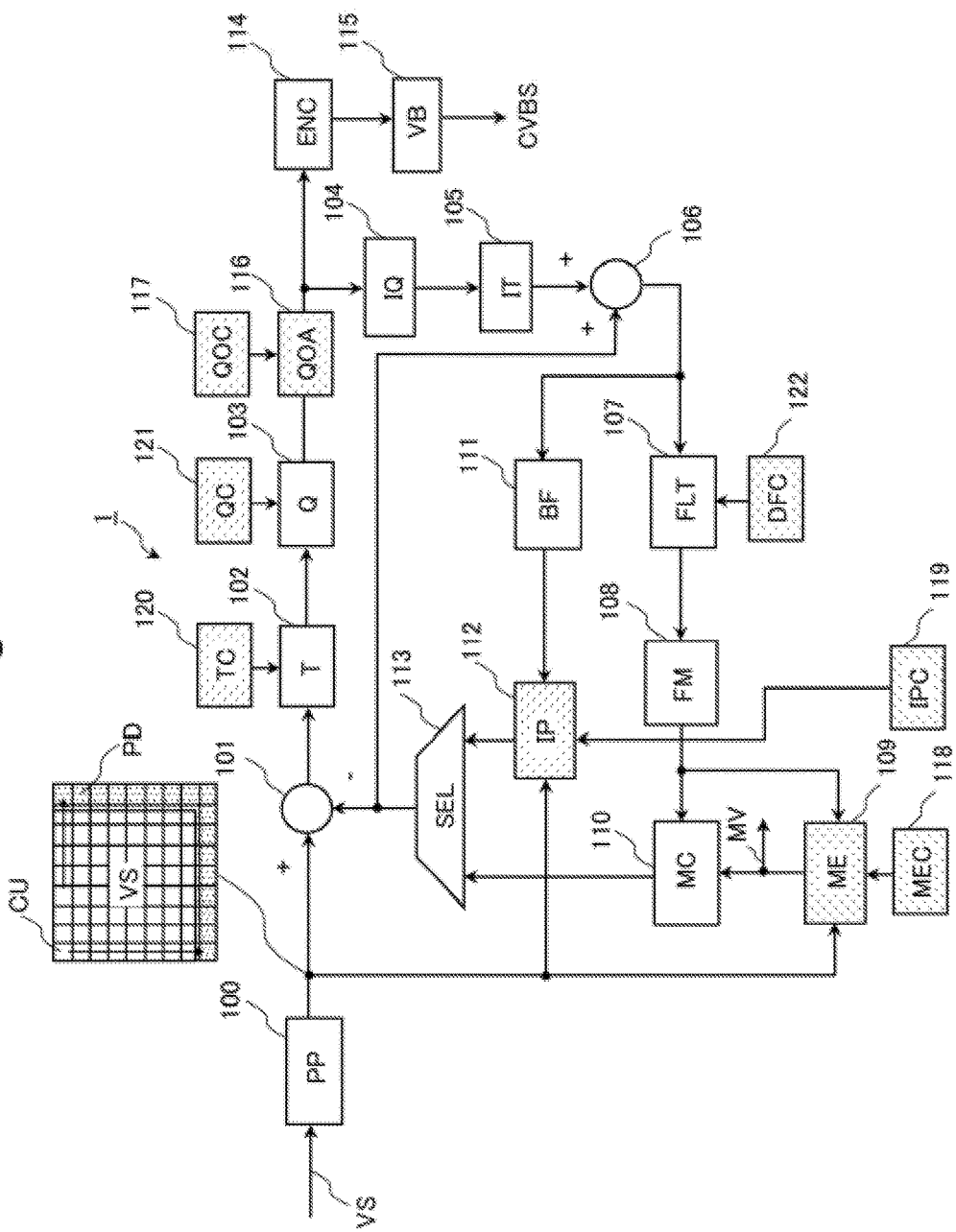
FIG. 1 is a diagram illustrating a configuration of a moving image encoding apparatus 1 according to a first embodiment.

First, summary of representative embodiments of the invention disclosed in the application will be described. Reference numerals in drawings in parentheses referred to in description of the summary of the representative embodiments just denote components included in the concept of the components to which the reference numerals are designated.

[1] A moving image encoding apparatus (1) according to a representative embodiment executes moving image encoding processing of a syntax element relating to a moving image signal (VS) that is to be encoded to form an encoded bitstream (CVBS) (refer to FIG. 1).

The moving image encoding apparatus (1) executes padding processing (100) of adding padding processing data (PD) to the moving image signal (VS) prior to the moving image encoding processing.

The horizontal and vertical sizes of an additional moving image signal, to which the padding processing data (PD) is added through the padding processing, are set to an integral multiple of an encoded block size in the moving image encoding processing.

The moving image encoding apparatus (1) determines to which of the moving image signal (VS) and the padding processing data (PD) an encoded block of the syntax element relating to the moving image signal belongs.

In a first case where the encoded block of the syntax element relating to the moving image signal is determined as belonging to the moving image signal through determination by the moving image encoding apparatus, the moving image encoding processing is controlled in accordance with the determination in the first case so that the encoded bitstream having a first code amount is formed.

In a second case where the encoded block of the syntax element relating to the moving image signal is determined as belonging to the padding processing data through another determination by the moving image encoding apparatus, the moving image encoding processing is controlled in accordance with the determination in the second case so that the encoded bitstream having a second code amount smaller than the first code amount is formed.

According to this embodiment, it is possible to reduce an increase in a code amount of an encoded bitstream that is generated from the moving image encoding apparatus during padding processing.

[2] According to a preferred embodiment, the moving image encoding apparatus (1) according to [1] includes a padding processing unit, a motion vector detection unit, a motion compensation unit, a subtractor, a frequency transform unit, a quantization unit, an inverse quantization unit, an inverse frequency transform unit, a memory (108, 111), an intra-prediction unit, a selector unit, and a variable length encoding unit.

The padding processing unit (100) executes the padding processing to generate the additional moving image signal, and supplies the additional moving image signal to the subtractor (101), the motion vector detection unit (109), and the intra-prediction unit (112).

The motion vector detection unit (109) generates a motion vector (MV) from the additional moving image signal, and an inter-reference image that is stored in the memory (108).

The motion compression unit (110) generates a motion compensation prediction signal in response to the motion vector (MV) that is generated from the motion vector detection unit (109), and the inter-reference image that is stored in the memory (108).

The intra-prediction unit (112) generates an intra-prediction signal from the additional moving image signal and the intra-reference image that is stored in the memory (111).

The selector unit (113) outputs a selection prediction signal that is selected from the motion compensation prediction signal that is generated from the motion compensation unit (110), and the intra-prediction signal that is generated from the intra-prediction unit (112).

The additional moving image signal is supplied to one input terminal of the subtractor (101), the selection prediction signal that is output from the selector unit (113) is supplied to the other input terminal of the subtractor (101), and a predictive residual is generated from an output terminal of the subtractor (101).

The predictive residual, which is generated from the output terminal of the subtractor (101), is subjected to frequency transform processing and quantization processing in the frequency transform unit (102) and the quantization unit (103), respectively.

A result of the frequency transform processing by the frequency transform unit (102), which is subjected to the quantization processing in the quantization unit (103), is subjected to local decoding processing by the inverse quantization unit (104) and the inverse frequency transform unit (105), and a result of the local decoding processing is stored in the memory (108, 111) as the inter-reference image and the intra-reference image.

The result of the frequency transform processing by the frequency transform unit (102), which is subjected to the quantization processing in the quantization unit (103), is subjected to encoding processing by the variable length encoding unit (114), and the encoded bitstream (CVBS) is generated from the variable length encoding unit (114).

The syntax element relating to the moving image signal is at least anyone of information (A) to information (D) (refer to FIG. 1).

(A) Information of the frequency transform processing by the frequency transform unit (102), which is subjected to the quantization processing in the quantization unit (103).

(B) Information of an encoded block that is encoded through inter-prediction by using the motion vector and the motion compensation prediction signal.

(C) Information of an encoded block that is encoded through intra-prediction by using the intra-reference image.

(D) Information of an encoded block that is subjected to quantization processing in the quantization unit (103).

[3] According to another preferred embodiment, the moving image encoding apparatus (1) according to [2] further includes a quantization output adjustment unit (116) that is connected between an output terminal of the quantization unit (103), an input terminal of the variable length encoding unit (114), and an input terminal of the inverse quantization unit (104), and a quantization output control unit (117) that is connected to the quantization output adjustment unit (116).

The quantization output control unit (117) determines to which of the moving image signal (VS) and the padding processing data (PD) the information of the frequency transform processing by the frequency transform unit (102), which is subjected to the quantization processing in the quantization unit (103) and is the syntax element relating to the moving image signal, belongs.

A quantization output signal (201) that is generated through the quantization processing by the quantization unit (103), an adjustment signal (200) having a data amount smaller than a data amount of the quantization output signal (201), and a determination result that is generated from the quantization output control unit (117) are supplied to the quantization output adjustment unit (116).

In response to a determination result of the quantization output control unit (117) which represents that the information of the frequency transform processing belongs to the moving image signal (VS), the quantization output adjustment unit (116) supplies the quantization output signal (201), which is generated from the quantization unit (103), to the input terminal of the variable length encoding unit (114) and the input terminal of the inverse quantization unit (104).

Figure 2:
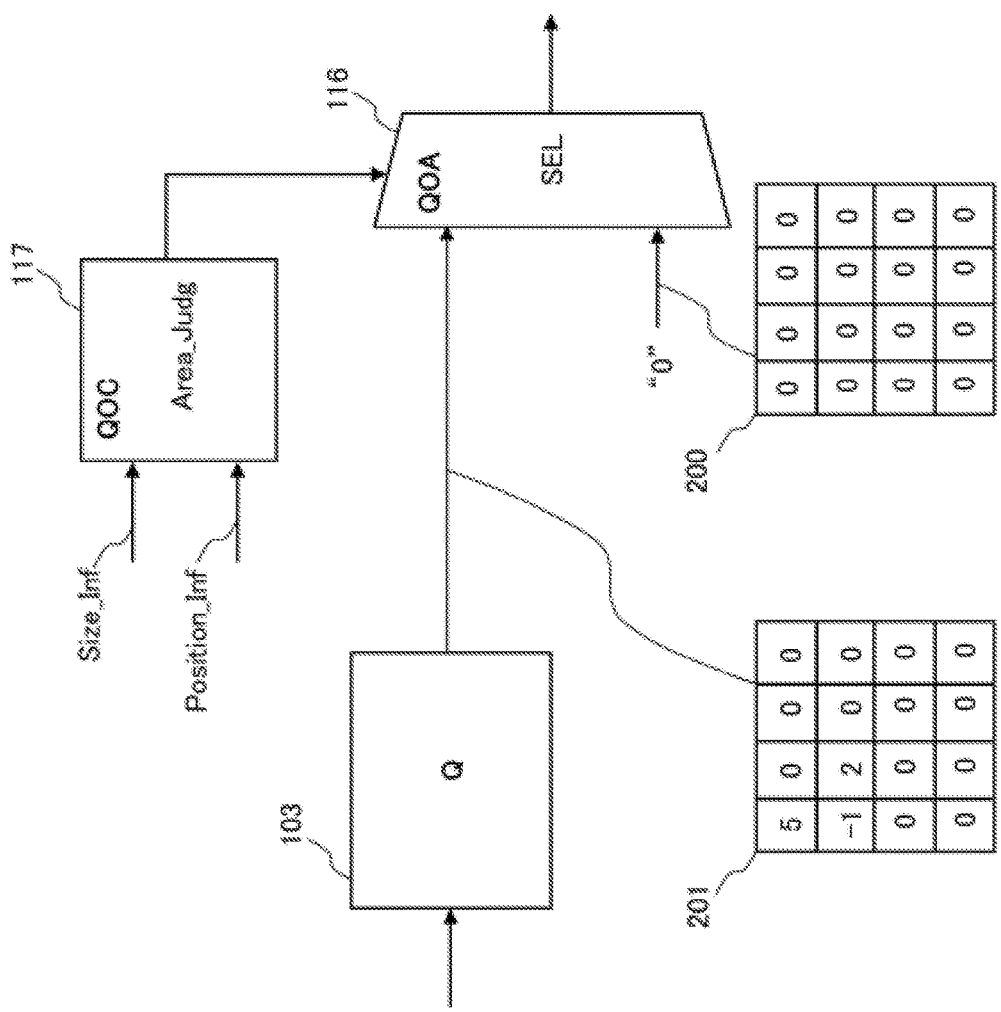
FIG. 2 is a diagram illustrating the operation of a quantization output adjustment unit 116 and a quantization output control unit 117 which are included in the moving image encoding apparatus 1 of the first embodiment.

In response to a determination result of the quantization output control unit (117) which represents that the information of the frequency transform processing belongs to the padding processing data (PD), the quantization output adjustment unit (116) supplies the adjustment signal (200) to the input terminal of the variable length encoding unit (114) and the input terminal of the inverse quantization unit (104) (refer to FIG. 1 and FIG. 2).

[4] According to still another preferred embodiment, the moving image encoding apparatus (1) according to [2] further includes a motion vector detection control unit (118) that is connected to the motion vector detection unit (109).

The motion vector detection unit (109) includes a motion vector search unit (1091), a prediction vector generation unit (1092), and a motion vector selector unit (1093).

The motion vector search unit (1091) executes a motion vector search operation with respect to the encoded block, which is included in the additional moving image signal and is encoded through inter-prediction, to generate a search motion vector (MV).

The prediction vector generation unit (1092) executes a motion vector prediction method, which is defined in a standard H. 264 or a standard H. 265, with respect to the encoded block which is included in the additional moving image signal and is encoded through inter-prediction to generate a prediction vector (PMV).

The motion vector detection control unit (118) determines to which of the moving image signal (VS) and the padding processing data (PD) the encoded block, which is included in the additional moving image signal, is the syntax element relating to the moving image signal, and is encoded through inter-prediction, belongs.

The search motion vector (MV) that is generated by the motion vector search unit (1091), the prediction vector (PMV) that is generated by the prediction vector generation unit (1092), and a determination result that is generated from the motion vector detection control unit (118) are supplied to the motion vector selector unit (1093).

In response to a determination result of the motion vector detection control unit (118) which represents that the encoded block that is encoded through the inter-prediction belongs to the moving image signal (VS), the motion vector selector unit (1093) supplies the search motion vector (MV) that is generated by the motion vector search unit (1091) to the motion compensation unit (110) as the motion vector (MV).

Figure 3:
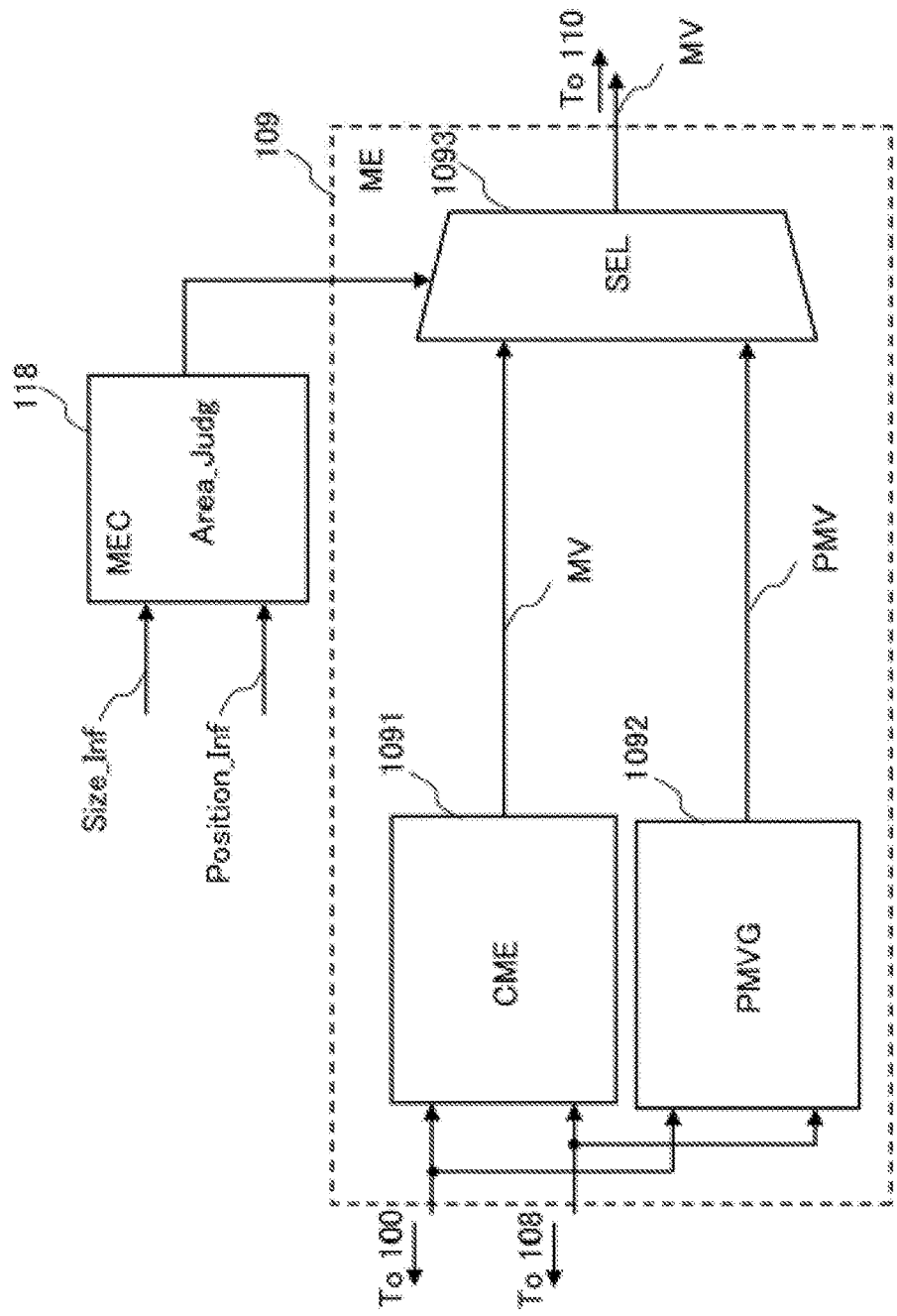
FIG. 3 is a diagram illustrating the configuration and the operation of a motion vector detection control unit 118 and a motion vector detection unit 109 which are included in the moving image encoding apparatus 1 of the first embodiment.

In response to a determination result of the motion vector detection control unit which represents that the encoded block that is encoded through the inter-prediction belongs to the padding processing data, the motion vector selector unit supplies the prediction vector (PMV) that is generated by the prediction vector generation unit to the motion compensation unit (110) as the motion vector (MV) (refer to FIG. 1 and FIG. 3).

[5] In a more preferred embodiment, the moving image encoding apparatus (1) according to [2] further includes an intra-prediction control unit (119) that is connected to the intra-prediction unit (112).

The intra-prediction unit (112) includes an intra-prediction direction determination unit (1121), a neighborhood prediction direction generation unit (1122), a prediction direction selector unit (1123), and an intra-prediction processing unit (1124).

The intra-prediction direction determination unit (1121) executes an intra-prediction operation with respect to the encoded block, which is included in the additional moving image signal and is encoded through intra-prediction, to generate a prediction direction (PD).

The neighborhood prediction direction generation unit (1122) executes a neighborhood direction prediction method that is defined in a standard H. 264 or a standard H. 265 with respect to the encoded block, which is included in the additional moving image signal and is encoded through intra-prediction, to generate a neighborhood prediction direction (NPD).

The intra-prediction control unit (119) determines to which of the moving image signal (VS) and the padding processing data (PD) the encoded block, which is included in the additional moving image signal, is the syntax element relating to the moving image signal, and is encoded through intra-prediction, belongs.

The prediction direction (PD) that is generated by the intra-prediction direction determination unit (1121), the neighborhood prediction direction (NPD) that is generated by the neighborhood prediction direction generation unit (1122), and a determination result that is generated from the intra-prediction control unit (119) are supplied to the prediction direction selector unit (1123).

In response to a determination result of the intra-prediction control unit (119) which represents that the encoded block that is encoded through the intra-prediction belongs to the moving image signal (VS), the prediction direction selector unit (1123) supplies the prediction direction (PD), which is generated by the intra-prediction direction determination unit (1121), to the intra-prediction processing unit (1124).

The intra-prediction processing unit (1124) generates the intra-prediction signal, which is supplied to the selector unit (113), from the prediction direction (PD) that is generated by the intra-prediction direction determination unit (1121), and the intra-reference image that is stored in the memory (111).

In response to a determination result of the intra-prediction control unit (119) which represents that the encoded block that is encoded through the intra-prediction belongs to the padding processing data (PD), the prediction direction selector unit (1123) supplies the neighborhood prediction direction (NPD), which is generated by the neighborhood prediction direction generation unit (1122), to the intra-prediction processing unit (1124).

Figure 4:
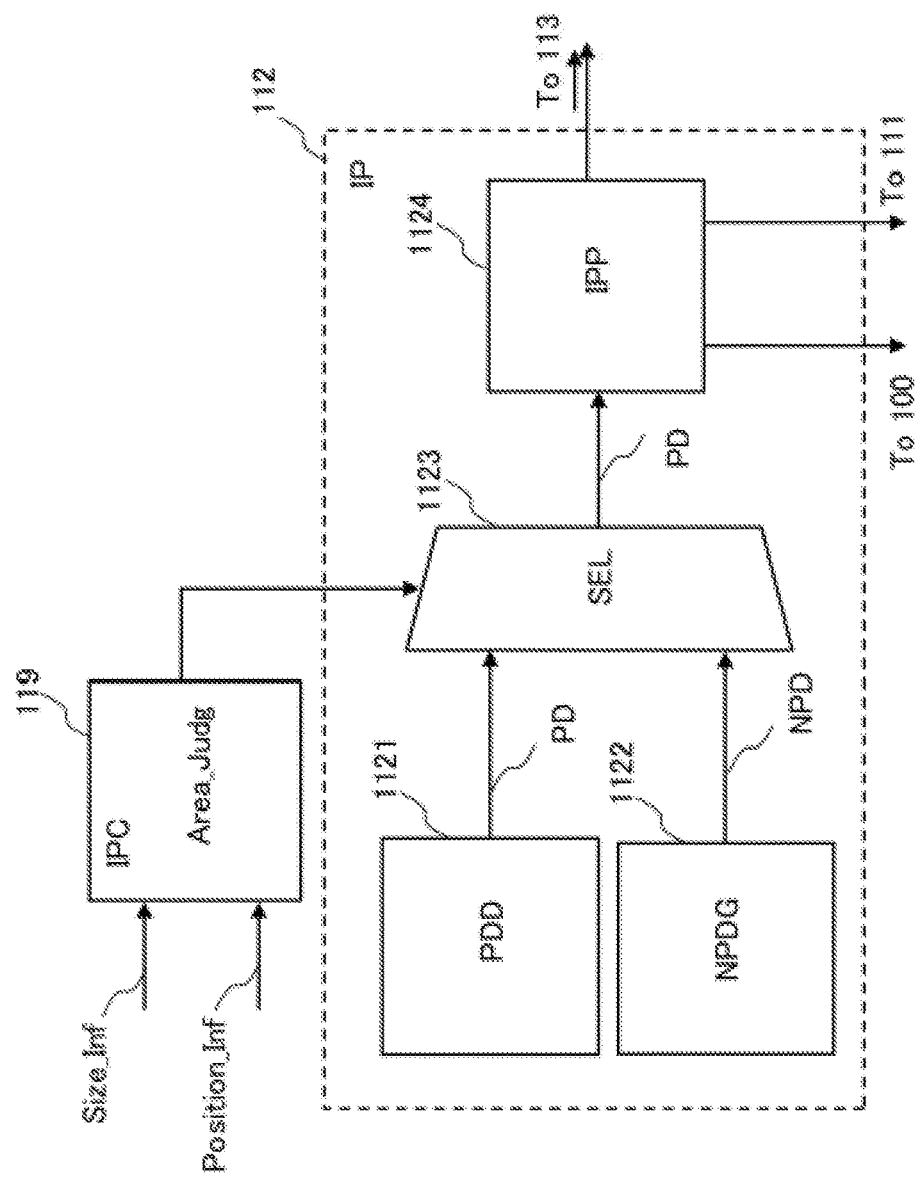
FIG. 4 is a diagram illustrating the configuration and the operation of an intra-prediction control unit 119 and an intra-prediction unit 112 which are included in the moving image encoding apparatus 1 of the first embodiment.

The intra-prediction processing unit (1124) generates the intra-prediction signal, which is supplied to the selector unit (113), from the neighborhood prediction direction (NPD) that is generated by the neighborhood prediction direction generation unit (1122), and the intra-reference image that is stored in the memory (111) (refer to FIG. 1 and FIG. 4).

[6] According to another more preferred embodiment, the moving image encoding apparatus (1) according to [3] further includes a frequency transform control unit (120) that is connected to the frequency transform unit (102).

The frequency transform control unit (120) sets a frequency transform size (TS) for the frequency transform processing that is executed in the frequency transform unit (102).

Figure 5:
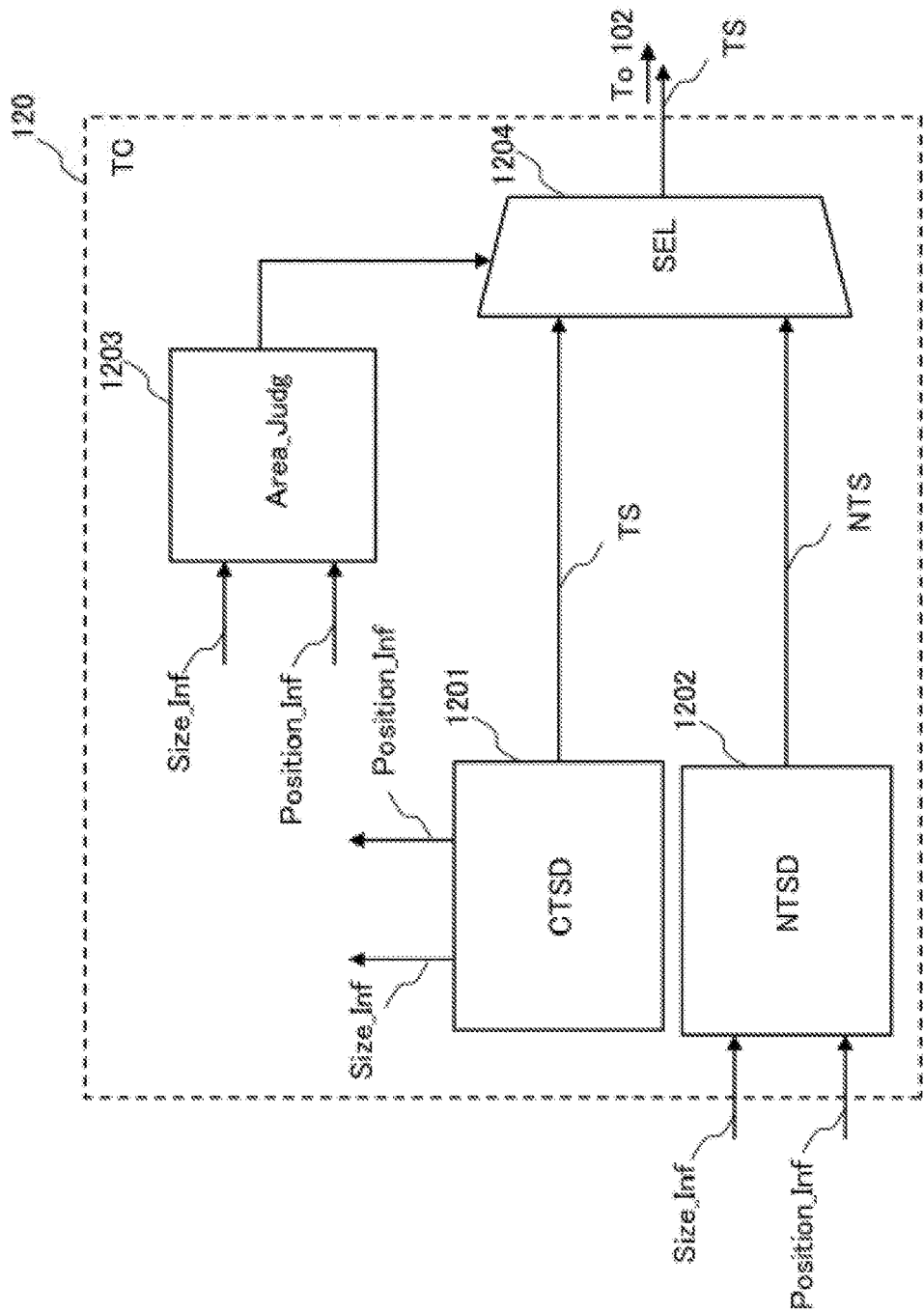
FIG. 5 is a diagram illustrating the configuration and the operation of a frequency transform control unit 120 that is included in the moving image encoding apparatus 1 of the first embodiment.

In response to the frequency transform size that is set by the frequency transform control unit (120), a partition operation of the encoded block in the frequency transform unit (102) is determined so that the encoded block processed by the frequency transform processing executed in the frequency transform unit does not simultaneously include the moving image signal and the padding processing data (refer to FIG. 1 and FIG. 5).

[7] According to still another preferred embodiment, in the moving image encoding apparatus (1) according to [6], the frequency transform control unit (120) includes a frequency transform size determination unit (1201), a non-cross-over frequency transform size determination unit (1202), an area determination unit (1203), and a frequency transform size selector unit (1204).

The frequency transform size determination unit (1201) selects one selection frequency transform size (TS) from a plurality of kinds of frequency transform size candidates (TS) which are defined in a standard H. 264 or a standard H. 265, and supplies the selection frequency transform size (TS) that is selected to one input terminal of the frequency transform size selector unit (1204).

The area determination unit (1203) determines whether or not an encoded block having the one selection frequency transform size (TS) crosses over a boundary between the moving image signal and the padding processing data.

The non-cross-over frequency transform size determination unit (1202) generates a non-cross-over frequency transform size (NTS) with which the encoded block processed by the frequency trans form processing does not cross over the boundary between the moving image signal and the padding processing data, and supplies the non-cross-over frequency transform size (NTS) that is generated to the other input terminal of the frequency transform size selector unit (1204).

In response to a determination result of the area determination unit (1203) which represents that the encoded block having the one selection frequency transform size does not cross over the boundary, the frequency transform size selector unit (1204) supplies the one selection frequency transform size to the frequency transform unit (102) as the frequency transform size (TS) for the frequency transform processing.

In response to a determination result of the area determination unit which represents that the encoded block having the one selection frequency transform size crosses over the boundary, the frequency transform size selector unit supplies the non-cross-over frequency transform size to the frequency transform unit as the frequency transform size for the frequency transform processing (refer to FIG. 1 and FIG. 5).

[8] According to still another more preferred embodiment, the moving image encoding apparatus (1) according to [2] further includes a quantization parameter control unit (121) that is connected to the quantization unit (103).

The quantization parameter control unit (121) includes a quantization parameter generation unit (1211), a quantization parameter register unit (1212), an area determination unit (1213), and a quantization parameter selector unit (1214).

The quantization parameter generation unit (1211) generates a quantization parameter (QP) that corresponds to the code amount of the encoded bitstream (CVBS) that is generated from the variable length encoding unit (114), and supplies the quantization parameter (QP) that is generated to one input terminal of the quantization parameter selector unit (1214), and an input terminal of the quantization parameter register unit (1212).

The quantization parameter (QP), which is generated at the output terminal of the quantization parameter register unit (1212), is supplied to the other input terminal of the quantization parameter selector unit (1214).

The area determination unit (1213) determines to which of the moving image signal (VS) and the padding processing data (PD) the encoded block, which is the syntax element relating to the moving image signal and is subjected to the quantization processing in the quantization unit (103), belongs.

In response to a determination result of the area determination unit (1213) which represents that the encoded block that is subjected to the quantization processing in the quantization unit (103) belongs to the moving image signal (VS), the quantization parameter selector unit (1214) supplies the quantization parameter (QP), which is supplied from the quantization parameter generation unit (1211) to the one input terminal, to the quantization unit (103).

Figure 6:
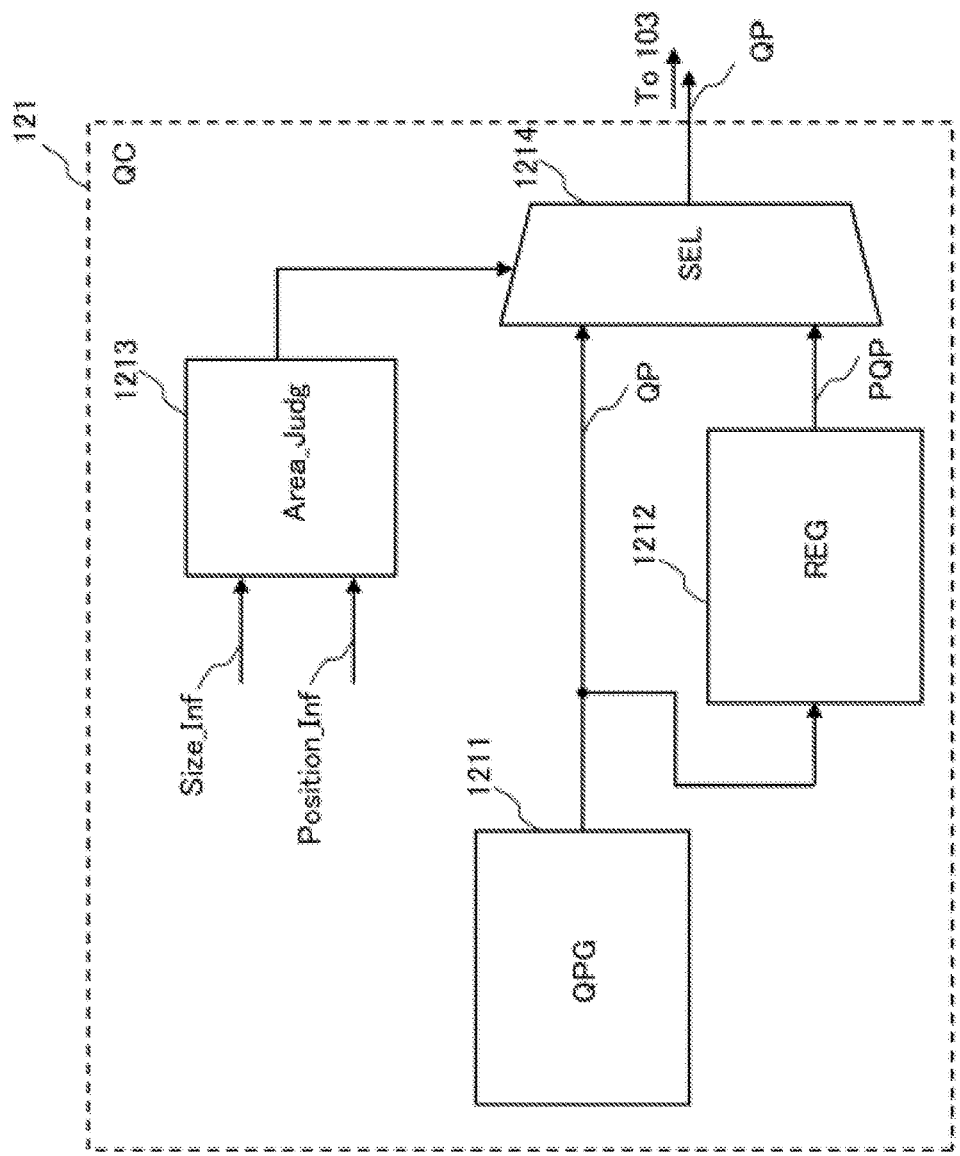
FIG. 6 is a diagram illustrating the configuration and the operation of a quantization parameter control unit 121 that is included in the moving image encoding apparatus 1 of the first embodiment.

In response to a determination result of the area determination unit which represents that the encoded block that is subjected to the quantization processing in the quantization unit belongs to the padding processing data (PD), the quantization parameter selector unit supplies the quantization parameter (QP), which is supplied from the output terminal of the quantization parameter register unit (1212) to the other input terminal, to the quantization unit (103) (refer to FIG. 1 and FIG. 6).

[9] According to still another more preferred embodiment, the moving image encoding apparatus (1) according to any one of [2] to [8] further includes a filter unit (107) and a filter control unit (122) which are connected to the memory (108).

The filter unit (107) executes deblocking filter processing with respect to the result of the local decoding processing that is executed by the inverse quantization unit (104) and the inverse frequency transform unit (105), and stores a result of the deblocking filter processing to the memory (108).

The filter control unit (122) determines to which of the moving image signal (VS) and the padding processing data (PD) the result of the local decoding processing, in which the deblocking filter processing by the filter unit (107) is executed, belongs.

In response to a determination result of the filter control unit (122) which represents that the result of the local decoding processing, in which the deblocking filter processing by the filter unit (107) is executed, belongs to the moving image signal (VS), the deblocking filter processing by the filter unit (107) is executed.

Figure 7:
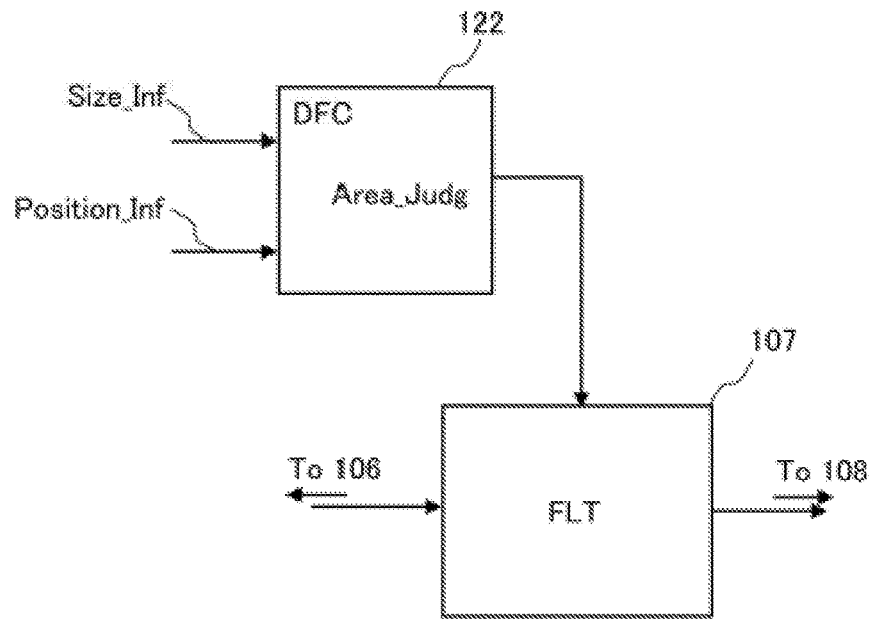
FIG. 7 is a diagram illustrating the configuration and the operation of a filter unit 107 and a filter control unit 122 for realization of low power consumption in a deblocking filter in the moving image encoding apparatus 1 of the first embodiment.

In response to a determination result of the filter control unit (122) which represents that the result of the local decoding processing, in which the deblocking filter processing by the filter unit (107) is executed, belongs to the padding processing data (PD), the execution of the deblocking filter processing by the filter unit (107) is stopped (refer to FIG. 1 and FIG. 7).

[10] According to a specific embodiment, in the moving image encoding apparatus (1) according to any one of [2] to [8], the motion vector detection unit, the motion compensation unit, the subtractor, the frequency transform unit, the quantization unit, the inverse quantization unit, the inverse frequency transform unit, the intra-prediction unit, the selector unit, and the variable length encoding unit are integrated in one semiconductor chip of a semiconductor integrated circuit (refer to FIG. 1).

[11] According to another specific embodiment, in the moving image encoding apparatus (1) according to any one of [2] to [8], the encoded block size in the moving image encoding processing is any one of a macro block having a size of 16 pixels×16 pixels, and a coding unit that can be formed from a largest coding unit having a size of 64 pixels×64 pixels (refer to FIG. 1).

[12] According to still another specific embodiment, the moving image encoding apparatus (1) according to any one of [2] to [8] executes moving image encoding processing of the moving image signal (VS) in conformity with a type that is arbitrarily selected from a standard H. 264 and a standard H. 265 to form the encoded bitstream (CVBS) (refer to FIG. 1).

[13] According to still another more preferred embodiment, the moving image encoding apparatus according to any one of [2] to [8] further includes an image division unit (301) and a plurality of moving image encoding processing units (1A, 1B, 1C, and 1D).

The image division unit (301) divides the moving image signal (VS) to generate a plurality of divided moving image signals.

The plurality of divided moving image signals, which are generated by the image division unit, are subjected to parallel processing by the plurality of moving image encoding processing units (1A, 1B, 1C, and 1D).

Figure 9:
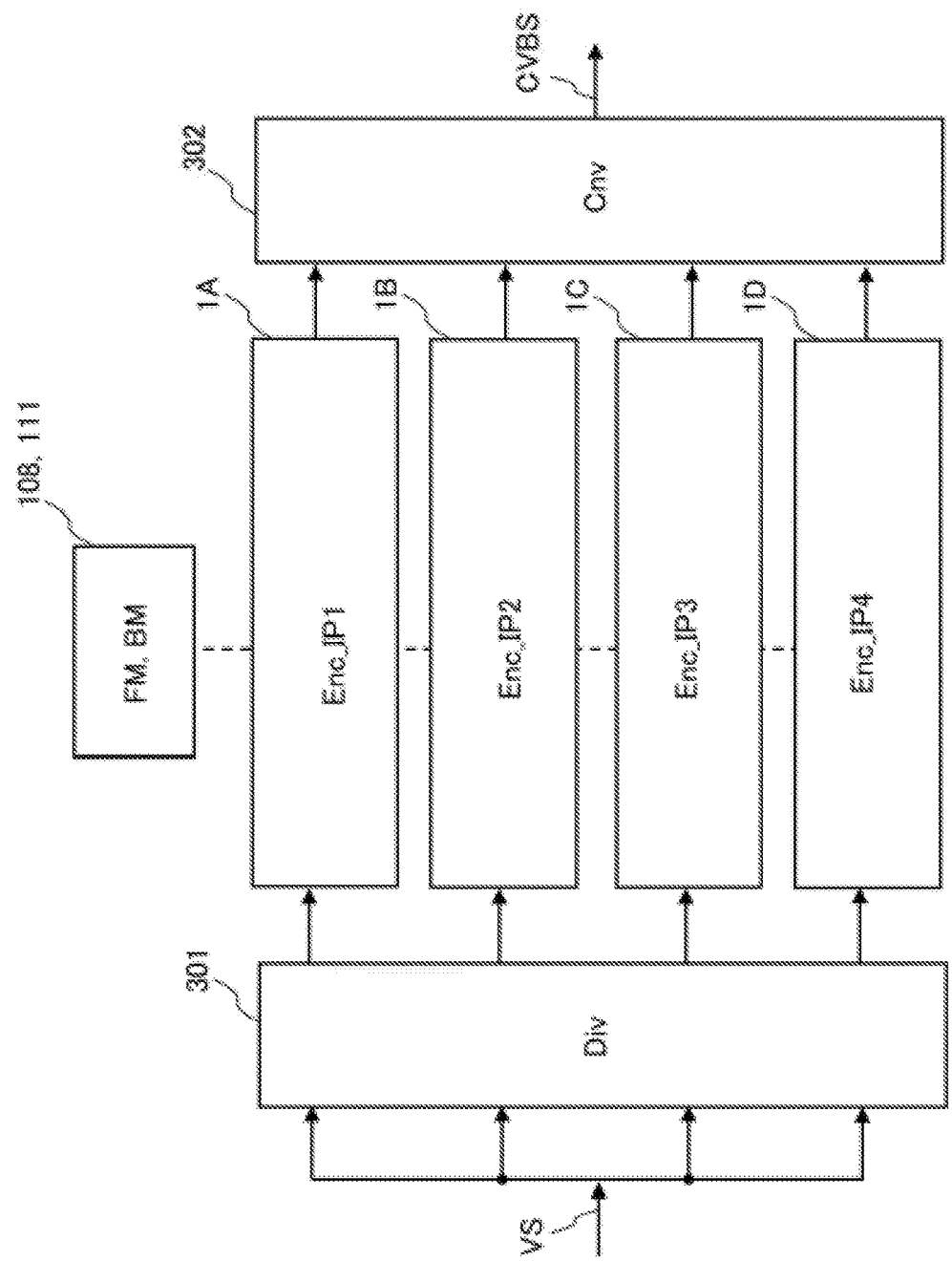
FIG. 9 is a diagram illustrating the configuration of a moving image encoding apparatus according to a second embodiment in which parallel processing of a slice level or a tile level is executed.

Each of the moving image encoding processing units of the plurality of moving image encoding processing units (1A, 1B, 1C, and 1D) includes the motion vector detection unit, the motion compensation unit, the subtractor, the frequency transform unit, the quantization unit, the inverse quantization unit, the inverse frequency transform unit, the intra-prediction unit, the selector unit, and the variable length encoding unit (refer to FIG. 9).

[14] According to still another specific embodiment, in the moving image encoding apparatus according to [13], the image division unit (301) and the plurality of moving image encoding processing units (1A, 1B, 1C, and 1D) are integrated in one semiconductor chip of a semiconductor integrated circuit (refer to FIG. 9).

[15] An embodiment according to another aspect relates to an operation method of the moving image encoding apparatus (1) that executes moving image encoding processing of the syntax element relating to the moving image signal (VS) that is to be encoded to form the encoded bitstream (CVBS) (refer to FIG. 1).

The moving image encoding apparatus (1) executes padding processing (100) of adding the padding processing data (PD) to the moving image signal (VS) prior to the moving image encoding processing.

The horizontal and vertical sizes of an additional moving image signal, to which the padding processing data (PD) is added through the padding processing, are set to an integral multiple of the encoded block size in the moving image encoding processing.

The moving image encoding apparatus (1) determines to which of the moving image signal (VS) and the padding processing data (PD) an encoded block of the syntax element relating to the moving image signal belongs.

In a first case where the encoded block of the syntax element relating to the moving image signal is determined as belonging to the moving image signal through determination by the moving image encoding apparatus, the moving image encoding processing is controlled in accordance with the determination in the first case so that the encoded bitstream having a first code amount is formed.

In a second case where the encoded block of the syntax element relating to the moving image signal is determined as belonging to the padding processing data through another determination by the moving image encoding apparatus, the moving image encoding processing is controlled in accordance with the determination in the second case so that the encoded bitstream having a second code amount smaller than the first code amount is formed.

According to this embodiment, it is possible to reduce an increase in the code amount of the encoded bitstream that is generated from the moving image encoding apparatus during the padding processing.

2. Further Detailed Description of the Embodiments

Embodiments will be described in more detail. In addition, in all drawings for description of the embodiments of the invention, the same reference numerals will be given to elements having the same function as in the drawings, and description thereof will not be repeated.

First Embodiment

«Configuration of Moving Image Encoding Apparatus»

FIG. 1 is a diagram illustrating a configuration of the moving image encoding apparatus 1 according to the first embodiment.

Figure 10:
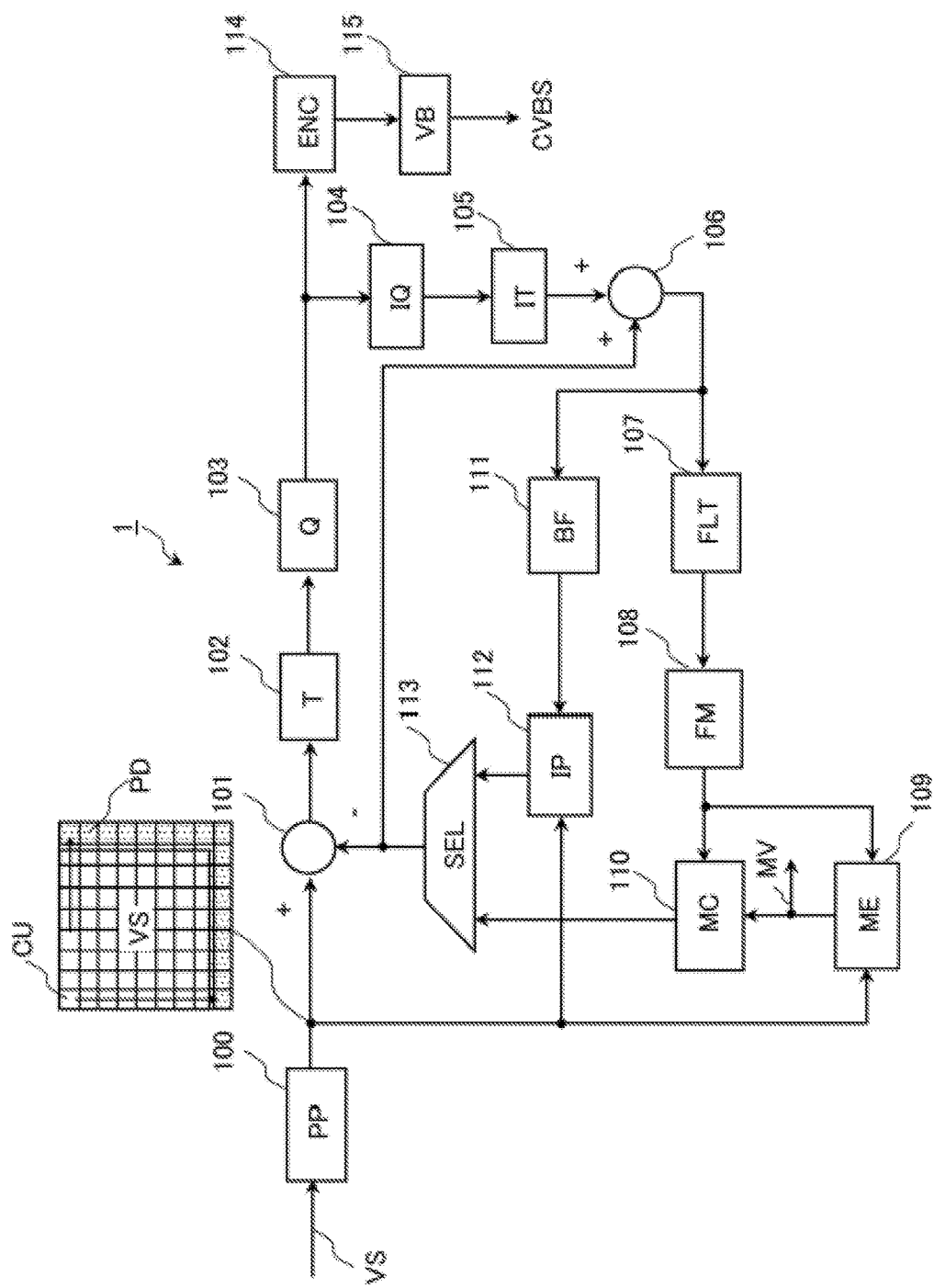
FIG. 10 is a diagram illustrating the configuration of a moving image encoding apparatus 1 capable of generating an encoded bitstream through encoding of a moving image input signal in conformity with a type selected between a current standard H. 264 and an HEVC standard which are examined by the present inventor prior to the invention.

As is the case with the moving image encoding apparatus 1 illustrated in FIG. 10, the moving image encoding apparatus 1 according to the first embodiment is capable of generating an encoded bitstream through encoding of a moving image input signal in conformity with anyone type that is selected between a current standard H. 264 and an HEVC standard.

The moving image encoding apparatus 1 of the first embodiment includes a padding processing unit 100, a subtractor 101, a frequency transform unit 102, a quantization unit 103, an inverse quantization unit 104, an inverse frequency transform unit 105, an adder 106, a variable length encoding unit 114, and a video buffer 115. In addition, the moving image encoding apparatus 1 includes a filter unit 107, a frame memory 108, a motion vector detection unit 109, a motion compensation unit 110, a buffer memory 111, an intra-prediction unit 112, and a selector unit 113.

So as to solve the above-described problem, the moving image encoding apparatus 1 of the first embodiment further includes a quantization output adjustment unit 116, a quantization output control unit 117, a motion vector detection control unit 118, an intra-prediction control unit 119, a frequency transform control unit 120, and a quantization parameter control unit 121 which are not included in the moving image encoding apparatus 1 illustrated in FIG. 10. In addition, the moving image encoding apparatus 1 of the first embodiment further includes a filter control unit 122 that controls a deblocking filter of the filter unit 107 for realization of low power consumption.

«Summary of Moving Image Encoding Apparatus»

Summary of the moving image encoding apparatus 1 of the first embodiment is as follows.

Specifically, the moving image encoding apparatus 1 of the first embodiment executes moving image encoding processing of a syntax element relating to a moving image signal (VS) that is to be encoded to form an encoded bitstream (CVBS).

The moving image encoding apparatus 1 executes padding processing of adding padding processing data PD to the moving image signal VS prior to the moving image encoding processing.

The horizontal and vertical sizes of an additional moving image signal, to which the padding processing data PD is added through the padding processing, are set to an integral multiple of an encoded block size in the moving image encoding processing.

The moving image encoding apparatus 1 determines to which of the moving image signal VS and the padding processing data PD an encoded block of the syntax element relating to the moving image signal VS belongs.

In a first case where the encoded block of the syntax element relating to the moving image signal VS is determined as belonging to the moving image signal VS through determination by the moving image encoding apparatus 1, the moving image encoding processing is controlled in accordance with the determination in the first case so that the encoded bitstream CVBS having a first code amount is formed.

In a second case where the encoded block of the syntax element relating to the moving image signal VS is determined as belonging to the padding processing data PD through another determination by the moving image encoding apparatus 1, the moving image encoding processing is controlled in accordance with the determination in the second case so that the encoded bitstream CVBS having a second code amount smaller than the first code amount is formed.

In the moving image encoding apparatus 1 according to the first embodiment, a first example of the syntax element relating to the moving image signal VS to be encoded is information of frequency trans form processing by the frequency transform unit 102 which is subjected to quantization processing in the quantization unit 103.

In addition, a second example of the syntax element relating to the moving image signal VS to be encoded is information of an encoded block that is encoded through inter-prediction by using the motion vector and the motion compensation prediction signal.

In addition, a third example of the syntax element relating to the moving image signal VS to be encoded is information of an encoded block that is encoded through intra-prediction by using the intra-reference image.

In addition, a fourth example of the syntax element relating to the moving image signal VS to be encoded is information of an encoded block that is subjected to quantization processing in the quantization unit 103.

In the above-described first example, the information of the frequency transform processing in the frequency transform unit 102, which is subjected to the quantization processing in the quantization unit 103, is supplied to an input terminal of the quantization output adjustment unit 116.

In the above-described second example, a partition operation of the encoded block in the motion vector detection unit 109 is controlled by the motion vector detection unit 109 itself so that the encoded block that is inter-encoded by the motion compensation unit 110 by using a motion vector MV, which is formed from the motion vector detection unit 109, includes any one of the moving image signal VS and the padding processing data PD.

In the above-described third example, a partition operation of an encoded block in the intra-prediction unit 112 is controlled by the intra-prediction unit 112 itself so that an encoded block that is intra-encoded by the intra-prediction unit 112 by using an intra-prediction direction includes any one of the moving image signal VS and the padding processing data PD.

In the above-described fourth example, in the case that the quantization unit 103 quantizes a frequency transform coefficient of the frequency transform unit 102, a partition operation of the encoded block in the quantization unit 103 is controlled by the quantization unit 103 itself so that the frequency transform coefficient that is an encoded block includes any one of the moving image signal VS and the padding processing data PD.

In the moving image encoding apparatus 1 according to the first embodiment, when at least one of the first example to the fourth example is selected and executed, it is possible to reduce an increase in the code amount of the encoded bitstream CVBS during padding processing.

In addition, in the moving image encoding apparatus 1 according to the first embodiment, when at least a plurality of the examples among the first to fourth examples are selected and executed, it is possible to further reduce an increase in the code amount of the encoded bitstream CVBS during the padding processing.

In addition, in the moving image encoding apparatus 1 according to the first embodiment, when the entirety of the first example to the fourth example are selected and executed, it is possible to greatly reduce an increase in the code amount of the encoded bitstream CVBS during the padding processing.

In addition, when at least one of the first example to the fourth example is selected and executed, a partition operation of an encoded block in the filter unit 107 is controlled by the filter unit 107 itself so that a local decoding processing result, which is an encoded block that is subjected to deblocking filter processing by the filter unit 107, includes only any one of the moving image signal VS and the padding processing data PD.

«Details of Moving Image Encoding Apparatus»

Hereinafter, details of the moving image encoding apparatus 1 according to the first embodiment will be described.

«Quantization Output Adjustment Unit and Quantization Output Control Unit»

FIG. 2 is a diagram illustrating the operation of the quantization output adjustment unit 116 and the quantization output control unit 117 which are included in the moving image encoding apparatus 1 of the first embodiment.

As described above with reference to FIG. 1, when a coding unit (CU) of the moving image signal VS, to which the padding processing data PD is added, is supplied to one input terminal of the subtractor 101, and a motion compensation prediction signal from the motion compensation unit 110 or intra-prediction information from the intra-prediction unit 12 is supplied to the other input terminal of the subtractor 101 through the selector unit 113, a predictive residual is generated from an output terminal of the subtractor 101. Frequency transform processing and quantization processing are executed in the frequency transform unit 102 and the quantization unit 103 with respect to the predictive residual that is a subtraction output signal of the subtraction unit 101.

Accordingly, as illustrated in FIG. 2, a quantized frequency transform coefficient 201 of the frequency transform unit 102 is generated from an output terminal of the quantization unit 103. The frequency transform unit 102 executes an integer-based discrete cosine transform (DCT) or discrete sine transform (DST) which output only an integral transform coefficient that does not include a decimal. Accordingly, the frequency transform coefficient 201 illustrated in FIG. 2 includes three integral non-zero coefficients ("5", "−1", and "2") and thirteen zero coefficients ("0"). The frequency transform coefficient 201 is supplied to one input terminal of the quantization output adjustment unit 116 that is constituted by a selector SEL.

On the other hand, an adjustment frequency transform coefficient 200, which includes sixteen zero coefficients ("0"), is supplied to the other input terminal of the quantization output adjustment unit 116 that is constituted by the selector SEL so that an encoded bitstream CVBS having a small code amount is generated from the variable length encoding unit 114.

In addition, as illustrated in FIG. 2, an output terminal of the quantization output control unit 117 is connected to a selection control terminal of the quantization output adjustment unit 116 that is constituted by the selector SEL.

Size information Size_Inf, which represents the horizontal and vertical pixel sizes of a coding unit (CU) that is supplied to one input terminal of the subtractor 101, is supplied to one input terminal of the quantization output control unit 117, and position information Position_Inf of the coding unit (CU), which is supplied to the one input terminal of the subtractor 101, is supplied to the other input terminal of the quantization output control unit 117. The position information Position_Inf is an upper-left raster scan initiation address (X, Y) of the coding unit (CU).

Figure 8:
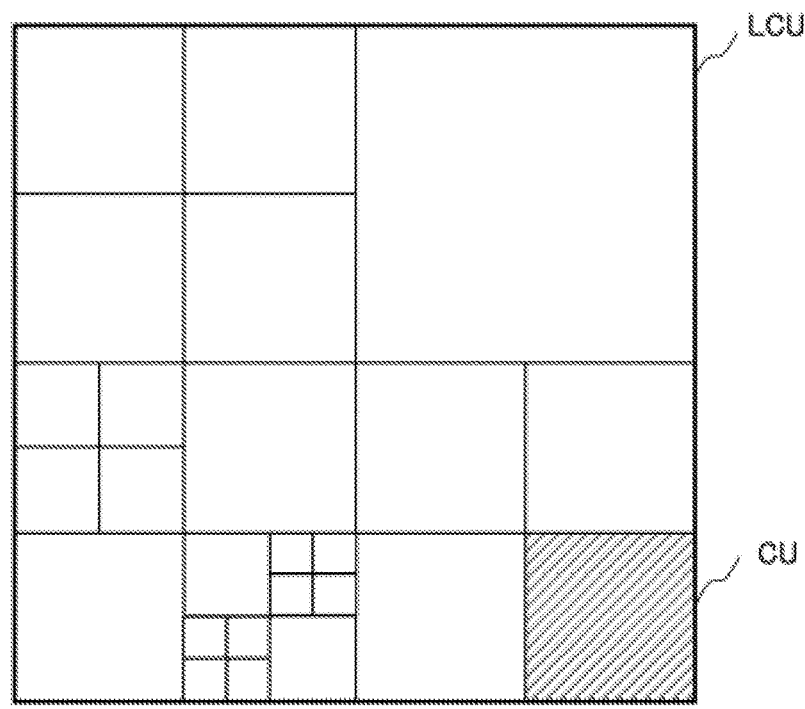
FIG. 8 is a diagram illustrating an aspect in which a coding unit (CU) is adaptively divided from the largest coding unit (LCU).

FIG. 8 is a diagram illustrating an aspect in which the coding unit (CU) is adaptively divided from the largest coding unit (LCU). Accordingly, at least any one of the upper-left raster scan initiation address of the largest coding unit (LCU), and an upper-left raster scan initiation address of a coding unit (CU) on an inner side of the largest coding unit (LCU) is supplied to the quantization output control unit 117 as the position information Position_Inf.

As described above, the size information Size_Inf and the position information Position_Inf of the coding unit (CU) are supplied to the quantization output control unit 117, and it is determined to which of the moving image signal VS and the padding processing PD the coding unit (CU) belongs.

In a case where the quantization output control unit 117 determines that the coding unit (CU) belongs to the moving image signal VS, for example, a selection output signal of a high level "1" is generated from an output terminal of the quantization output control unit 117. As a result, in response to the selection output signal of the high level "1" which is generated from the output terminal of the quantization output control unit 117, the quantization output adjustment unit 116 selects the frequency transform coefficient 201 including the three non-zero coefficients and the thirteen zero coefficients, which are supplied to the one input terminal, and outputs the frequency transform coefficient 201 to an output terminal thereof. Accordingly, the frequency transform coefficient 201 including the three non-zero coefficients and the thirteen zero coefficients, which are output to the output terminal of the quantization output adjustment unit 116, is supplied to an input terminal of the variable length encoding unit 114 and an input terminal of the inverse quantization unit 104. As a result, in response to the frequency transform coefficient 201, the variable length encoding unit 114 forms an encoded bitstream CVBS having a relatively large code amount as a first code amount. Accordingly, in this case, a moving image decoding apparatus (Video Decoder), to which the encoded bitstream CVBS is supplied, can reproduce the moving image signal VS with high image quality.

On the other hand, in a case where the quantization output control unit 117 determines that the coding unit (CU) belongs to the padding processing data PD, for example, a selection output signal of a low level "0" is generated from the output terminal of the quantization output control unit 117. As a result, in response to the selection output signal of the low level "0" which is generated from the output terminal of the quantization output control unit 117, the quantization output adjustment unit 116 selects the adjustment frequency transform coefficient 200 including sixteen zero coefficients which are supplied to the other input terminal, and outputs the adjustment frequency transform coefficient 200 to the output terminal thereof. Accordingly, the adjustment frequency transform coefficient 200, which is output to the output terminal of the quantization output adjustment unit 116 and includes sixteen zero coefficients, is supplied to the input terminal of the variable length encoding unit 114 and the input terminal of the inverse quantization unit 104. As a result, in response to the adjustment frequency transform coefficient 200, the variable length encoding unit 114 forms an encoded bitstream CVBS having a second code amount that is smaller than the first code amount. Accordingly, in this case, it is possible to reduce an increase in the code amount of the encoded bitstream CVBS due to the padding processing in the padding processing unit 100. In a case where the encoded bitstream CVBS is accumulated in a recording disk such as a non-volatile memory and a DVD which have a constant video storage capacity, it is possible to lengthen a recording time in proportion to the reduction, or it is possible to realize high image quality in proportion to the reduction.

In addition, in the moving image encoding apparatus 1 of the first embodiment, as illustrated in FIG. 1 and FIG. 2, the frequency transform coefficient 201 or the adjustment frequency transform coefficient 200, which is output to the output terminal of the quantization output adjustment unit 116, is supplied to the input terminal of the variable length encoding unit 114 and the input terminal of the inverse quantization unit 104. Accordingly, it is possible to prevent mismatching from occurring between a result of local decoding processing that is executed by the inverse quantization unit 104, the inverse frequency transform unit 105, the adder 106, the filter unit 107, and the frame memory 108, and a reproduction image of the moving image decoding apparatus (Video Decoder) to which the encoded bitstream CVBS is supplied. If the mismatching occurs, an error is accumulated in the local decoding processing result that is stored in the frame memory 108, and thus an error occurs also in a predictive residual, which is a subtraction output signal of the subtractor 101, during the subsequent encoding processing of the coding unit (CU). Therefore, there is a problem in that accuracy of the encoding processing in the moving image encoding apparatus 1 decreases.

In addition, in the moving image encoding apparatus 1 of the first embodiment, as illustrated in FIG. 1, the quantization output adjustment unit 116 is connected between the output terminal of the quantization unit 103, the input terminal of the variable length encoding unit 114, and the input terminal of the inverse quantization unit 104. In another embodiment, when using two quantization output adjustment units 116, a first quantization output adjustment unit 116 may be connected between the output terminal of the quantization unit 103 and the input terminal of the variable length encoding unit 114, and a second quantization output adjustment unit 116 may be connected between the output terminal of the quantization unit 103 and the input terminal of the inverse quantization unit 104. In addition, the single quantization output control unit 117 may commonly control the first quantization output adjustment unit 116 and the second quantization output adjustment unit 116 to determine to which of the moving image signal VS and the padding processing data PD the coding unit (CU) belongs. In this another embodiment, it is also possible to reduce an increase in the code amount of the encoded bitstream CVBS through the padding processing in the padding processing unit 100. Accordingly, it is possible to prevent mismatching from occurring between the above-described local decoding processing result and a reproducing image of the moving image decoding apparatus.

In addition, in a case where the moving image encoding apparatus 1 of the first embodiment generates an encoded bitstream CVBS through encoding of a moving image input signal in conformity with the current standard H. 264, a macro block (MB) having a size of 16 pixels×16 pixels in terms of a luminance component is processed instead of the above-described coding unit (CU). When it is determined to which of the moving image signal VS and the padding processing data PD the macro block (MB) belongs, any one of the frequency transform coefficient 201 and the adjustment frequency transform coefficient 200 is output from the output terminal of the quantization output adjustment unit 116.

«Motion Vector Detection Control Unit and Motion Vector Detection Unit»

FIG. 3 is a diagram illustrating the configuration and the operation of the motion vector detection control unit 118 and the motion vector detection unit 109 which are included in the moving image encoding apparatus 1 of the first embodiment.

As illustrated in FIG. 3, the motion vector detection unit 109 includes a motion vector search unit 1091, a prediction vector generation unit 1092, and a motion vector selector unit 1093.

The motion vector search unit 1091 executes a motion vector search operation that is typical in the standards of MPEG-2 and MPEG-4 to generate a motion vector MV, and supplies the motion vector MV that is generated to one input terminal of the motion vector selector unit 1093. In the typical motion vector search operation that is executed by the motion vector search unit 1091, the motion vector MV of the coding unit (CU), which is encoded through inter-prediction with reference to a motion vector MV of a coding unit (CU) in the vicinity of the coding unit (CU) that is encoded through the inter-prediction, is searched and generated.

The prediction vector generation unit 1092 executes a prediction method that is defined in the current standard H. 264 and the HEVC standard to generate a prediction vector PMV, and supplies the prediction vector PMV that is generated to the other input terminal of the motion vector selector unit 1093.

In the prediction method that is defined in the current standard H. 264, the median value of three motion vectors of three macro blocks (MB) in the vicinity of a macro block (MB) that is encoded through the inter-prediction is regarded as a prediction vector PMV that is used in the case of encoding of the macro block (MB) that is encoded through the inter-prediction. This prediction value is obtained by a method that is arbitrarily determined between the moving image encoding apparatus and the moving image decoding apparatus, and thus a code transmission for designation of the prediction value is not executed between both the apparatuses.

In the prediction method that is defined in the HEVC standard, there is used a method of creating a candidate list of motion vectors, which may be a prediction value for the coding unit (CU) that is encoded through the inter-prediction, selecting the optimal prediction candidate among the motion vector included in the list on an encoding side, encoding an index of the optimal prediction candidate, and transmitting the encoded index to a decoding side. According to this method, a prediction vector PMV as a prediction value, in which a predictive difference mostly decreases, is selected, and thus it is possible to encode the motion vector MV.

As illustrated in FIG. 3, size information Size_Inf, which represents the horizontal and vertical pixel sizes of the macro block (MB) or the coding unit (CU) which is encoded through the inter-prediction, is supplied to one input terminal of the motion vector detection control unit 118. On the other hand, position information Position_Inf of the macro block (MB) or the coding unit (CU), which is encoded through the inter-prediction, is supplied to the other input terminal of the motion vector detection control unit 118. The position information Position_Inf is an upper-left raster scan initiation address (X, Y) of the macro block (MB) or the coding unit (CU).

As described above, the size information Size_Inf and the position information Position_Inf of the macro block (MB) or the coding unit (CU) are supplied to the motion vector detection control unit 118, and it is determined to which of the moving image signal VS and the padding processing data PD the macro block (MB) or the coding unit (CU) belongs.

In a case where the motion vector detection control unit 118 determines that the macro block (MB) or the coding unit (CU) which is encoded through the inter-prediction belongs to the moving image signal VS, for example, a selection output signal of a high level "1" is generated from an output terminal of the motion vector detection control unit 118. Accordingly, in response to the selection output signal of the high level "1" which is generated from the output terminal of the motion vector detection control unit 118, the motion vector selector unit 1093 selects the motion vector MV that is supplied from the motion vector search unit 1091 to the one input terminal, and outputs the motion vector MV, which is selected, to an output terminal thereof. As a result, the motion vector MV, which is generated from the motion vector search unit 1091 of the motion vector detection unit 109, is supplied to the motion compensation unit 110 through the motion vector selector unit 1093. Accordingly, in response to the motion vector MV that is generated from the motion vector search unit 1091 of the motion vector detection unit 109 and the reference image that is stored in the frame memory 108, the motion compensation unit 110 generates a motion compensation prediction signal. In the case of the inter-prediction, the variable length encoding unit 114 encodes a difference vector (MVD: Motion Vector Difference) that is a difference between the motion vector MV that is generated from the motion vector selector unit 1093 of the motion vector detection unit 109 and the prediction vector PMV that is generated from the prediction vector generation unit 1092 of the motion vector detection unit 109. Encoding information of the difference vector (MVD), which relates to encoding by the variable length encoding unit 114, is included in the encoded bitstream CVBS, and thus the moving image decoding apparatus, to which the encoded bitstream CVBS is supplied, can reproduce the moving image signal VS through decoding of information of the difference vector (MVD) relating to the moving image signal VS. As described above, in the case of the inter-prediction of the moving image signal VS, in response to the difference vector (MVD), the variable length encoding unit 114 forms an encoded bitstream CVBS having a relatively large code amount as a first code amount. As a result, the moving image decoding apparatus, to which the encoded bitstream CVBS having a relatively large code amount is supplied, can reproduce the moving image signal VS with high image quality.

In contrast, in a case where the motion vector detection control unit 118 determines that the macro block (MB) or the coding unit (CU), which is encoded through the inter-prediction, belongs to the padding processing data PD, for example, a selection output signal of a low level "0" is generated from the output terminal of the motion vector detection control unit 118. As a result, in response to the selection output signal of a low level "0" which is generated, the motion vector selector unit 1093 selects the prediction vector PMV, which is supplied from the prediction vector generation unit 1092 of the motion vector detection unit 109 to the other input terminal, and outputs the prediction vector PMV to the output terminal thereof. Accordingly, in a case of the inter-prediction of the padding processing data PD, the prediction vector PMV, that is generated from the prediction vector generation unit 1092, is output from the motion vector selector unit 1093 of the motion vector detection unit 109. Accordingly, in this case, the difference vector (MVD) that is a difference (MV−PMV) between the prediction vector PMV that is generated from the motion vector selector unit 1093 of the motion vector detection unit 109 as the motion vector MV, and the prediction vector PMV that is generated from the prediction vector generation unit 1092 of the motion vector detection unit 109 becomes a substantially zero value. The difference vector (MVD) having a substantially zero value is encoded by the variable length encoding unit 114. As a result, in response to the difference vector (MVD) having a substantially zero value, the variable length encoding unit 114 forms an encoded bitstream CVBS having a second code amount that is smaller than the first code amount. Among pieces of information of the encoded bitstream CVBS, information of the padding processing data PD, which is encoded by the variable length encoding unit 114, does not have a great effect on the image quality of the moving image signal VS that is reproduced with the moving image decoding apparatus. Accordingly, in this case, it is possible to reduce an increase in the code amount of the encoded bitstream CVBS due to the padding processing in the padding processing unit 100. In a case where the encoded bitstream CVBS is accumulated in a recording disk having a constant video storage capacity, it is possible to lengthen a recording time in proportion to the reduction, or it is possible to realize high image quality in proportion to the reduction.

«Intra-Prediction Control Unit and Intra-Prediction Unit»

FIG. 4 is a diagram illustrating the configuration and the operation of the intra-prediction control unit 119 and the intra-prediction unit 112 which are included in the moving image encoding apparatus 1 of the first embodiment.

As illustrated in FIG. 4, the intra-prediction unit 112 includes an intra-prediction direction determination unit 1121, a neighborhood prediction direction generation unit 1122, a prediction direction selector unit 1123, and an intra-prediction processing unit 1124.

The intra-prediction direction determination unit 1121 executes an intra-prediction operation that is typical in the standards of MPEG-4, H. 264, and H. 265 to generate a prediction direction PD, and the prediction direction PD that is generated is supplied to one input terminal of the prediction direction selector unit 1123. The typical intra-prediction operation that is executed by the intra-prediction direction determination unit 1121 is as follows. That is, in MPEG-4, the prediction direction PD includes two directions of a horizontal direction and a vertical direction. In addition, in H. 264, the prediction direction PD includes nine directions which are described in NPL 1, and in the HEVC standard, the prediction direction PD includes prediction directions of 34 modes which are described in NPL 2.

As is the case with the prediction vector generation unit 1092 illustrated in FIG. 3, the neighborhood prediction direction generation unit 1122 executes a prediction method that is defined in the current standard H. 264 and the HEVC standard to generate a neighborhood prediction direction NPD, and the neighborhood prediction direction NPD, which is generated, is supplied to the other input terminal of the prediction direction selector unit 1123.

As illustrated in FIG. 4, size information Size_Inf, which represents the horizontal and vertical pixel sizes of a macro block (MB) or a coding unit (CU) which is encoded through the intra-prediction, is supplied to one input terminal of the intra-prediction control unit 119. On the other hand, position information Position_Inf of the macro block (MB) or the coding unit (CU), which is encoded through the intra-prediction, is supplied to the other input terminal of the intra-prediction control unit 119. The position information Position_Inf is an upper-left raster scan initiation address (X, Y) of the macro block (MB) or the coding unit (CU).

As described above, the size information Size_Inf and the position information Position_Inf of the macro block (MB) or the coding unit (CU) is supplied to the intra-prediction control unit 119, and it is determined to which of the moving image signal VS and the padding processing data PD the macro block (MB) or the coding unit (CU) belongs.

In a case where the intra-prediction control unit 119 determines that the macro block (MB) or the coding unit (CU) which is encoded through the intra-prediction belongs to the moving image signal VS, for example, a selection output signal of a high level "1" is generated from an output terminal of the intra-prediction control unit 119. Accordingly, in response to the selection output signal of the high level "1" which is generated from the output terminal of the intra-prediction control unit 119, the prediction direction selector unit 1123 selects the prediction direction PD that is supplied from the intra-prediction direction determination unit 1121 to the one input terminal, and outputs the prediction direction PD, which is selected, to an output terminal thereof. As a result, the prediction direction PD, which is generated from the intra-prediction direction determination unit 1121, is supplied to the intra-prediction processing unit 1124 through the prediction direction selector unit 1123. A coding unit (CU) of the moving image signal VS to which the padding processing data PD is added, and a reference image of which intra-coding is completed are supplied to the intra-prediction processing unit 1124 from the padding processing unit 100 and the buffer memory 111, respectively. Accordingly, the intra-prediction processing unit 1124 supplies an intra-predicted optimal coding unit (CU) to the selector unit 113 by using the prediction direction PD, the coding unit (CU), and the reference image of which the intra-encoding is completed. In the case of the intra-prediction, the variable length encoding unit 114 encodes a difference prediction direction (PDD: Prediction Direction Difference) that is a difference (PD−NPD) between the prediction direction PD that is generated from the prediction direction selector unit 1123 of the intra-prediction unit 112, and the neighborhood prediction direction NPD that is generated from the neighborhood prediction direction generation unit 1122 of the intra-prediction unit 112. Encoding information of the difference prediction direction (PDD), which relates to encoding by the variable length encoding unit 114, is included in the encoded bitstream CVBS, and thus the moving image decoding apparatus, to which the encoded bitstream CVBS is supplied, can reproduce the moving image signal VS through decoding of the information of the difference prediction direction (PDD) relating to the moving image signal VS. As described above, in the case of the intra-prediction of the moving image signal VS, in response to the difference prediction direction (PDD), the variable length encoding unit 114 forms an encoded bitstream CVBS having a relatively large code amount as a first code amount. As a result, the moving image decoding apparatus, to which the encoded bitstream CVBS having a relatively large code amount is supplied, can reproduce the moving image signal VS with high image quality.

In contrast, in a case where the intra-prediction control unit 119 determines that the macro block (MB) or the coding unit (CU) which is encoded through the intra-prediction belongs to the padding processing data PD, for example, a selection output signal of a low level "0" is generated from the output terminal of the intra-prediction control unit 119. Accordingly, in response to the selection output signal of a low level "0" which is generated, the prediction direction selector unit 1123 selects the neighborhood prediction direction NPD that is supplied from the neighborhood prediction direction generation unit 1122 of the intra-prediction control unit 119 to the other input terminal, and outputs the neighborhood prediction direction NPD that is selected to the output terminal thereof. Accordingly, in the case of the intra-prediction of the padding processing data PD, the neighborhood prediction direction NPD, which is generated from the neighborhood prediction direction generation unit 1122, is output from the prediction direction selector unit 1123 of the intra-prediction unit 112. Accordingly, in this case, a difference prediction direction (PDD) that is a difference (PD−NPD) between the neighborhood prediction direction NPD, which is generated from the prediction direction selector unit 1123 of the intra-prediction unit 112, as the prediction direction PD, and the neighborhood prediction direction NPD that is generated from the neighborhood prediction direction generation unit 1122 of the intra-prediction unit 112 becomes a substantially zero value. The difference prediction direction (PDD) having a substantially zero value is encoded by the variable length encoding unit 114. As a result, in response to the difference prediction direction (PDD) having the substantially zero value, the variable length encoding unit 114 forms an encoded bitstream CVBS having a second code amount that is smaller than the first code amount. Among pieces of information of the encoded bitstream CVBS, the information of the padding processing data PD which is encoded by the variable length encoding unit 114 does not have a great effect on the image quality of the moving image signal VS that is reproduced with the moving image decoding apparatus. Accordingly, in this case, it is possible to reduce an increase in the code amount of the encoded bitstream CVBS due to the padding processing in the padding processing unit 100. In a case where the encoded bitstream CVBS is accumulated in a recording disk which has a constant video storage capacity, it is possible to lengthen a recording time in proportion to the reduction, or it is possible to realize high image quality in proportion to the reduction.

«Frequency Transform Control Unit»

FIG. 5 is a diagram illustrating the configuration and the operation of the frequency transform control unit 120 that is included in the moving image encoding apparatus 1 of the first embodiment.

Figure 11:
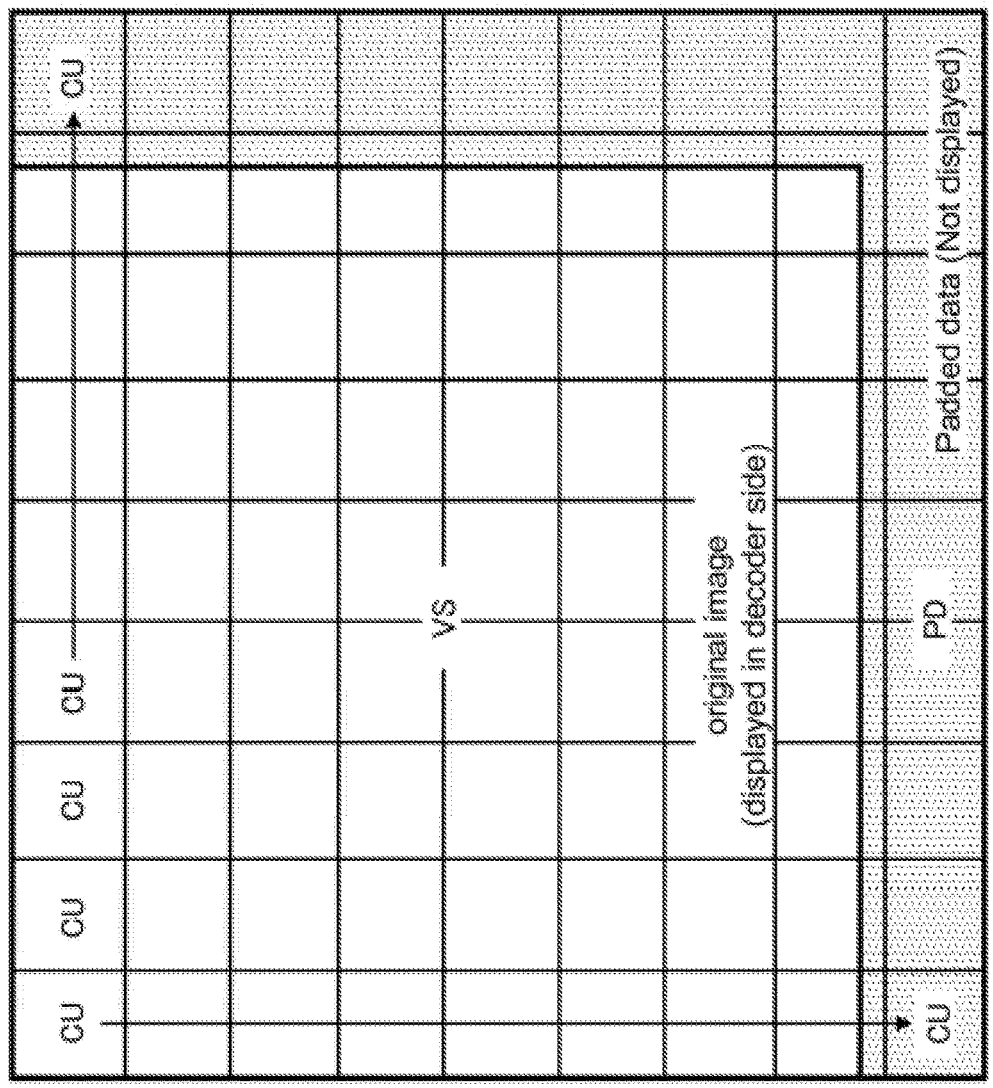
FIG. 11 is a diagram illustrating padding processing in a padding processing unit 100 of the moving image encoding apparatus 1 illustrated in FIG. 10 which is examined by the present inventors prior to the invention.

With regard to the adjustment operation for the quantized frequency transform coefficient by the quantization output adjustment unit 116 and the quantization output control unit 117 which is described with reference to FIG. 2, it is assumed that one coding unit (CU) simultaneously includes a pixel value of the moving image signal VS and a pixel value of the padding processing data PD as illustrated in FIG. 11. As illustrated in FIG. 11, one coding unit (CU), which simultaneously includes the pixel value of the moving image signal VS and the pixel value of the padding processing data PD, exists at the boundary between an area of the moving image signal VS and an area of the padding processing data PD. With regard to one coding unit (CU) that simultaneously includes the pixel value of the moving image signal VS and the pixel value of the padding processing data PD as described above, the quantization output adjustment unit 116 operates to make a mixing determination as belonging to the moving image signal VS. Accordingly, with regard to one coding unit (CU) that simultaneously includes the pixel value of the moving image signal VS and the pixel value of the padding processing data PD, the variable length encoding unit 114 forms an encoded bitstream CVBS having a large code amount. As a result, the moving image signal VS, which is included in one coding unit (CU) that simultaneously includes the pixel value of the moving image signal VS and the pixel value of the padding processing data PD, can be reproduced with high image quality by the moving image decoding apparatus (Video Decoder). In addition, in a case of H. 264, with regard to one macro block (MB) that simultaneously includes the pixel value of the moving image signal VS and the pixel value of the padding processing data PD, it is also necessary to make the mixing determination for the one macro block (MB) as belonging to the moving image signal VS.

As described above, with regard to one macro block (MB) or coding unit (CU) that simultaneously includes the pixel value of the moving image signal VS and the pixel value of the padding processing data PD, the reason why it is also necessary to make a determination as one macro block (MB)

or coding unit (CU) belongs to the moving image signal VS is true of the motion vector detection control unit 118 in FIG. 3 and the intra-prediction control unit 119 in FIG. 4. The necessity is completely true of the quantization parameter control unit 121 to be described later with reference to FIG. 6, and the filter control unit 122 to be described below with reference to FIG. 7.

However, when the quantization output control unit 117 in FIG. 2, the motion vector detection control unit 118 in FIG. 3, the intra-prediction control unit 119 in FIG. 4, and the quantization parameter control unit 121 in FIG. 6 execute the above-described mixing determination method, with regard to the padding processing data PD that is included in one mixing-type coding unit (CU) or macro block (MB), an encoded bitstream CVBS having a large code amount is formed. As a result, there is a possibility that the effect of reducing an increase in the code amount due to the quantization output control unit 117 in FIG. 2, the motion vector detection control unit 118 in FIG. 3, the intra-prediction control unit 119 in FIG. 4, and the quantization parameter control unit 121 in FIG. 6 may decrease. In addition, when the filter control unit 122 in FIG. 7 executes the above-described mixing determination method, with regard to padding processing data PD that is included in one mixing-type coding unit (CU) or macro block (MB), a deblocking filter function of the filter unit 107 is activated, and thus there is a problem in that an effect of low power consumption may also decrease.

In frequency transform processing in the frequency transform unit 102 included in the moving image encoding apparatus 1 of the first embodiment, the frequency transform control unit 120 illustrated in FIG. 5 is configured to execute a partition operation so that one coding unit (CU) does not simultaneously include a pixel value of the moving image signal VS and a pixel value of the padding processing data PD. That is, one coding unit (CU) includes only any one of the pixel value of the moving image signal VS and the pixel value of the padding processing data PD through the partition operation of the coding unit (CU) in the frequency transform unit 102. In other words, one coding unit (CU) does not cross over the boundary between the moving image signal VS and the padding processing data PD. Further, in other words, the boundary of one coding unit (CU) equals to the boundary between the moving image signal VS and the padding processing data PD.

As illustrated in FIG. 5, the frequency transform control unit 120 includes a frequency transform size determination unit 1201, a non-cross-over frequency transform size determination unit 1202, an area determination unit 1203, and a frequency transform size selector unit 1204.

In the H. 264 standard, two kinds of frequency transform sizes including a size of 8 pixels×8 pixels and a size of 4 pixels×4 pixels can be used during frequency transform of one macro block (MB) having a size of 16 pixels×16 pixels in terms of a luminance component.

In the HEVC standard, four kinds of frequency transform sizes including a size of 32 pixels×32 pixels, 16 pixels×16 pixels, 8 pixels×8 pixels, and 4 pixels×4 pixels can be used during frequency transform of one coding unit (CU) that can be divided from one largest coding unit (LCU) having a size of 64 pixels×64 pixels in terms of a luminance component.

The frequency transform size determination unit 1201 of the frequency transform control unit 120 illustrated in FIG. 5 selects one frequency transform size TS from two kinds of frequency transform sizes of the H. 264 standard, or four kinds of frequency transform sizes of the HEVC standard, and supplies the one frequency transform size TS that is selected to one input terminal of the frequency transform size selector unit 1204. For example, the one frequency transform size TS is determined with timing at which the motion compensation prediction signal is generated from the motion compensation unit 110, or timing at which the intra-prediction signal is generated from the intra-prediction unit 112. That is, at a portion in which a pixel value of an image signal of the motion compensation prediction signal or the intra-prediction signal monotonously varies, the frequency transform size determination unit 1201 selects a relatively large size as the frequency trans form size TS. In contrast, at a portion in which the pixel value of the image signal of the motion compensation prediction signal or the intra-prediction signal complicatedly varies, the frequency transform size determination unit 1201 selects a relatively small size as the frequency transform size TS. In addition, the frequency transform size determination unit 1201 determines the frequency transform size TS of one macro block (MB) or one coding unit (CU), and determines size information Size_Inf and position information Position_Inf of one macro block (MB) or one coding unit (CU).

The size information Size_Inf and the position information Position_Inf are supplied to the area determination unit 1203. The area determination unit 1203 determines whether or not one macro block (MB) or one coding unit (CU) having the size information Size_Inf and the position information Position_Inf crosses over the boundary between the moving image signal VS and the padding processing data PD. In a case where a determination result of the area determination unit 1203 is "NO", the area determination unit 1203 generates a selection output signal of the high level "1", and supplies the selection output signal as a selection control signal of the frequency transform size selector unit 1204. In response to the selection output signal of a high level "1" which is generated from an output terminal of the area determination unit 1203, the frequency transform size selector unit 1204 selects a frequency transform size TS, which is supplied from the frequency transform size determination unit 1201 to one input terminal thereof, and outputs the frequency transform size TS to an output terminal thereof. As a result, the frequency transform unit 102 that is included in the moving image encoding apparatus 1 of the first embodiment executes the frequency transform processing of one coding unit (CU) or one macro block (MB) in accordance with the frequency transform size TS. In contrast, in a case where the determination result of the area determination unit 1203 is "YES", the area determination unit 1203 generates a selection output signal of a low level "0", and supplies the selection output signal as the selection control signal of the frequency transform size selector unit 1204. Accordingly, in response to the selection output signal of the low level "0" which is generated from the output terminal of the area determination unit 1203, the frequency transform size selector unit 1204 selects a non-cross-over frequency transform size NTS that is supplied from the non-cross-over frequency transform size determination unit 1202 to the other input terminal, and outputs the non-cross-over frequency transform size to the output terminal thereof. In response to size information Size_Inf and position information Position_Inf of one macro block (MB) or one coding unit (CU) which are supplied form the frequency transform size determination unit 1201, the non-cross-over frequency transform size determination unit 1202 generates a non-cross-over frequency transform size NTS, and supplies the non-cross-over frequency transform size NTS to the other input terminal of the frequency transform size selector unit 1204. As a result, the frequency transform unit 102, which is included in the moving image encoding apparatus 1 of the first embodiment, executes the frequency transform processing of one coding unit (CU) or one macro block (MB) in accordance with the non-cross-over frequency transform size TS that is generated by the non-cross-over frequency transform size determination unit 1202.

«Quantization Parameter Control Unit»

FIG. 6 is a diagram illustrating the configuration and the operation of the quantization parameter control unit 121 that is included in the moving image encoding apparatus 1 of the first embodiment.

As illustrated in FIG. 6, the quantization parameter control unit 121 includes a quantization parameter generation unit 1211, a quantization parameter register unit 1212, an area determination unit 1213, and a quantization parameter selector unit 1214.

On the other hand, bit rate control is executed through adjustment of a quantization parameter QP that is used in quantization processing in the quantization unit 103 so as to prevent the code amount of a compressed video encoded bitstream CVBS, which is generated from the variable length encoding unit 114 included in the moving image encoding apparatus 1 of the first embodiment, from being excessive.

That is, the quantization parameter control unit 121, which is connected to the quantization unit 103, executes adjustment control of the quantization parameter QP for bit rate control. Accordingly, for example, the quantization parameter generation unit 1211 determines a code amount of the compressed video encoded bitstream CVBS that is generated from the variable length encoding unit 114 from data satisfaction degree and the like of the video buffer 115 that is connected to an output of the variable length encoding unit 114. In a case where the code amount is large, the quantization parameter generation unit 1211 sets the quantization parameter QP to a large value. Accordingly, in response to the quantization parameter QP of a large value, the quantization unit 103 can reduce the number of bits of the frequency transform coefficient to be quantized, and thus it is possible to prevent the code amount of the compressed video encoded bitstream CVBS from being excessive. In contrast, in a case where the code amount is small, the quantization parameter generation unit 1211 sets the quantization parameter QP to a small value. As a result, in response to the quantization parameter QP having a small value, the quantization unit 103 increases the number of bits of the frequency transform coefficient to be quantized, and thus it is possible to increase the code amount of the compressed video encoded bitstream CVBS, and it is possible to generate the compressed video encoded bitstream CVBS with high image quality.

However, in the moving image encoding apparatus 1 of the first embodiment, the variable length encoding unit 114 is configured to encode a difference quantization parameter (QPD: Quantization Parameter Difference), which is a temporal variation amount of the quantization parameter QP of the quantization unit 103, as a syntax element. As a result, the syntax element of the difference quantization parameter (QPD) is included in the compressed video encoded bitstream CVBS that is generated from the variable length encoding unit 114, and thus the moving image decoding apparatus (Decoder) can also execute a moving image decoding operation with accuracy by using the difference quantization parameter (QPD).

On the other hand, in the quantization unit 103, among pieces of information to be quantized, a pixel value of the moving image signal VS is necessary for a moving image decoding operation with high image quality in the moving image decoding apparatus, but a pixel value of information of the padding processing data PD does not have a great effect on image quality of the moving image signal VS that is reproduced with the moving image decoding apparatus.

Accordingly, the quantization parameter control unit 121 illustrated in FIG. 6 according to the first embodiment includes the area determination unit 1213 configured to determine to which of the moving image signal VS and the padding processing data PD the macro block (MB) or the coding unit (CU) which is quantized by the quantization unit 103 belongs. Size information Size_Inf and position information Position_Inf of the macro block (MB) or the coding unit (CU), which is quantized by the quantization unit 103, are supplied to the area determination unit 1213.

In a case where the macro block (MB) or the coding unit (CU), which is quantized by the quantization unit 103, is determined as belonging to the moving image signal VS, for example, a selection output signal of a high level "1" is generated from an output terminal of the area determination unit 1213. As a result, in response to the selection output signal of the high level "1" which is generated from the output terminal of the area determination unit 1213, the quantization parameter selector unit 1214 selects a quantization parameter QP that is supplied from the quantization parameter generation unit 1211 to one input terminal thereof, and outputs the quantization parameter QP to an output terminal thereof. Accordingly, in accordance with the quantization parameter QP, the quantization unit 103 executes quantization processing with respect to the frequency transform coefficient of the macro block (MB) or the coding unit (CU), which belongs to the moving image signal VS, in accordance with the frequency transform unit 102. In this case, the variable length encoding unit 114 encodes a difference quantization parameter (QPD) that is a difference (QP−PQP) between a quantization parameter QP that is generated from the quantization parameter selector unit 1214 of the quantization parameter control unit 121, and an immediately previous quantization parameter PQP that is stored in the quantization parameter register unit 1212 and is generated from the quantization parameter register unit 1212. Encoding information of the difference quantization parameter (QPD) in accordance with the variable length encoding unit 114 is included in the encoded bitstream CVBS, and thus the moving image decoding apparatus, to which the encoded bitstream. CVBS is supplied, can reproduce the moving image signal VS through decoding of information of the difference quantization parameter (QPD) with respect to the moving image signal VS. As described above, in the case of the quantization processing of the moving image signal VS, in response to the difference quantization parameter (QPD), the variable length encoding unit 114 forms an encoded bitstream CVBS having a relatively large code amount as a first code amount. As a result, the moving image decoding apparatus, to which the encoded bitstream CVBS having a relatively large code amount is supplied, can reproduce the moving image signal VS with high image quality.

In contrast, in a case where a macro block (MB) or a coding unit (CU), which is quantized by the quantization unit 103, is determined as belonging to the padding processing data PD, a selection output signal of a low level "0" is generated from the output terminal of the area determination unit 1213. As a result, in response to the selection output signal of the low level "0" which is generated from the output terminal of the area determination unit 1213, the quantization parameter selector unit 1214 selects a quantization parameter PQP immediately before being supplied to the other input terminal from the quantization parameter register unit 1212, and outputs the quantization parameter PQP to the output terminal thereof. As a result, in accordance with the immediately previous quantization parameter PQP, the quantization unit 103 executes quantization processing with respect to the frequency transform coefficient of the macro block (MB) or the coding unit (CU), which belongs to the padding processing data PD, in accordance with the frequency transform unit 102. In this case, a difference quantization parameter (QPD), which is a difference (QP−PQP) between the quantization parameter QP that is generated from the quantization parameter selector unit 1214 of the quantization parameter control unit 121, and the immediately previous quantization parameter PQP that is stored in the quantization parameter register unit 1212 and is generated from the prediction vector generation unit 1092 becomes a substantially zero value. The variable length encoding unit 114 encodes the difference quantization parameter (QPD) having the substantially zero value. As a result, in response to the difference quantization parameter (QPD) having the substantially zero value, the variable length encoding unit 114 forms an encoded bitstream CVBS having a second code amount that is smaller than the first code amount. Among pieces of information of the encoded bitstream CVBS, information of the padding processing data PD to be encoded by the variable length encoding unit 114 does not have a great effect on image quality of the moving image signal VS that is reproduced with the moving image decoding apparatus. As a result, it is possible to reduce an increase in the code amount of the encoded bitstream CVBS due to the padding processing in the padding processing unit 100. In a case where the encoded bitstream CVBS is accumulated in a recording disk which has a constant video storage capacity, it is possible to lengthen a recording time in proportion to the reduction, or it is possible to realize high image quality in proportion to the reduction.

《Filter Unit and Filter Control Unit》

FIG. 7 is a diagram illustrating the configuration and the operation of the filter unit 107 and the filter control unit 122 for realization of low power consumption in a deblocking filter in the moving image encoding apparatus 1 of the first embodiment.

As described above, the filter unit 107, which is included in the moving image encoding apparatus 1 of the first embodiment, has a deblocking filter function of reducing block distortion in conformity with the H. 264 standard. On the other hand, a result of local decoding processing by the inverse quantization unit 104, the inverse frequency transform unit 105, and the adder 106 is subjected to filter processing with the deblocking filter function of the filter unit 107. However, information, which is subjected to the filter processing with the deblocking filter function of the filter unit 107, may belong to the moving image signal VS or the padding processing data PD.

When the local decoding processing result, which belongs to the moving image signal VS, is subjected to the filter processing with the deblocking filter function of the filter unit 107, it is possible to reduce block distortion of the reference image that is stored in the frame memory 108 and is used for the intra-prediction. However, even though the local decoding processing result belonging to the padding processing data PD is subjected to the filter processing with the filter unit 107, it is difficult to reduce block distortion of the reference image that is stored in the frame memory 108 and is used for the intra-prediction.

Accordingly, in a case where deblocking filter processing target information, which is supplied from the adder 106 to the filter unit 107, belongs to the moving image signal VS, the filter unit 107 and the filter control unit 122 in FIG. 7 according to the first embodiment execute the deblocking filter processing with respect to the information. However, in a case where information, which is supplied from the adder 106 to the filter unit 107 and is a deblocking filter processing target, belongs to the padding processing data PD, the filter unit 107 and the filter control unit 122 in FIG. 7 according to the first embodiment stop the execution of the deblocking filter processing with respect to the information.

That is, size information Size_Inf and position information Position_Inf of the deblocking filter processing target information, which are supplied from the adder 106 to the filter unit 107, are supplied to the filter control unit 122 illustrated in FIG. 7.

In a case where the filter control unit 122 determines that the deblocking filter processing target information belongs to the moving image signal VS, for example, an operation selection signal of a high level "1" is generated from an output terminal of the filter control unit 122. Accordingly, the deblocking filter function of the filter unit 107 is activated in response to the operation output signal of the high level "1" which is generated from the output terminal of the filter control unit 122. As a result, the deblocking filter function of the filter unit 107 executes the deblocking filter processing with respect to the information that belongs to the moving image signal VS.

In a case where the filter control unit 122 determines that the deblocking filter processing target information belongs to the padding processing data PD, for example, a non-operation selection signal of a low level "1" is generated from the output terminal of the filter control unit 122. Accordingly, the deblocking filter function of the filter unit 107 is inactivated in response to the non-operation selection signal of the low level "1" which is generated from the output terminal of the filter control unit 122. As a result, the deblocking filter function of the filter unit 107 stops execution of the deblocking filter processing with respect to the information that belongs to the padding processing data PD. In this manner, according to the filter unit 107 and the filter control unit 122 in FIG. 7 according to the first embodiment, it is possible to reduce power consumption of the deblocking filter.

《Semiconductor Integrated Circuit of Moving Image Encoding Apparatus》

The majority of the moving image encoding apparatus 1 of the first embodiment except for the frame memory 108, the buffer memory 111, and the video buffer 115 is integrated in one semiconductor chip of a semiconductor integrated circuit. For example, the semiconductor integrated circuit is a large scale semiconductor integrated circuit called a system LSI or a system on chip (SOC) that is manufactured by the most advanced semiconductor manufacturing process.

That is, in the moving image encoding apparatus 1 of the first embodiment, the padding processing unit 100, the subtractor 101, the frequency transform unit 102, the quantization unit 103, the inverse quantization unit 104, the inverse frequency transform unit 105, the adder 106, and the variable length encoding unit 114 are integrated in one semiconductor chip of a semiconductor integrated circuit. In addition, the filter unit 107, the frame memory 108, the motion vector detection unit 109, the motion compensation unit 110, the buffer memory 111, the intra-prediction unit 112, and the selector unit 113 are also integrated in the one semiconductor chip. In addition, the quantization output adjustment unit 116, the quantization output control unit 117, the motion vector detection control unit 118, the intra-prediction control unit 119, the frequency transform control unit 120, the quantization parameter control unit 121, and the filter control unit 122 are also integrated in the one semiconductor chip. In addition, the frame memory 108, the buffer memory 111, and the video buffer 115 are integrated in a semiconductor chip of synchronous dynamic random access memory (SDRAM) which is different from the one semiconductor chip.

Second Embodiment

«Configuration of Moving Image Encoding Apparatus Subjected to Parallel Processing»

FIG. 9 is a diagram illustrating the configuration of a moving image encoding apparatus according to the second embodiment in which parallel processing of a slice level or a tile level is executed.

As described in NPL 1, a slice is encoded or decoded independently from other slices of a picture, and thus the slice can be used for parallel processing. In addition, as described in NPL 2, a tile is configured to execute the parallel processing, and the tile is formed by dividing the picture to quadrangular areas.

As illustrated in FIG. 9, the moving image encoding apparatus according to the second embodiment which executes the parallel processing includes an image division unit 301, an image construction unit 302, a plurality of moving image encoding processing units 1A, 1B, 1C, 1D, ..., the frame memory 108, and the buffer memory 111.

The image division unit 301, to which the moving image signal VS is supplied, divides the moving image signal VS to generate a plurality of the slices or a plurality of the tiles. The plurality of slices or the plurality of tiles, which are generated by the image division unit 301, are supplied to the plurality of moving image encoding processing units LA, 1B, 1C, and 1D, respectively.

Each of the moving image encoding processing units of the plurality of the moving image encoding processing units 1A, 1B, 1C, and 1D is configured similar to the moving image encoding apparatus 1 of the first embodiment. That is, each of the moving image encoding processing units includes the padding processing unit 100, the subtractor 101, the frequency transform unit 102, the quantization unit 103, the inverse quantization unit 104, the inverse frequency transform unit 105, the adder 106, and the variable length encoding unit 114. In addition, each of the moving image encoding processing units includes the motion vector detection unit 109, the motion compensation unit 110, the buffer memory 111, the intra-prediction unit 112, and the selector unit 113. In addition, the each of the moving image encoding processing units further includes the quantization output adjustment unit 116, the quantization output control unit 117, the motion vector detection control unit 118, the intra-prediction control unit 119, the frequency transform control unit 120, the quantization parameter control unit 121, and the filter control unit 122.

A plurality of moving image encoding processing results, which are generated from the plurality of moving image encoding processing units 1A, 1B, 1C, and 1D, are supplied to the image construction unit 302. The image construction unit 302 generates the compressed video encoded bitstream CVBS from the plurality of moving image encoding processing results of the plurality of moving image encoding processing units 1A, 1B, 1C, and 1D.

The moving image encoding processing operation of the plurality of moving image encoding processing units 1A, 1B, 1C, and 1D is completely the same as in the moving image encoding apparatus 1 of the first embodiment, and thus description thereof will not be repeated.

The majority of the moving image encoding apparatus of the second embodiment except for the frame memory 108, the buffer memory 111, and the video buffer 115 is integrated in one semiconductor chip of a semiconductor integrated circuit. The semiconductor integrated circuit is also a large scale semiconductor integrated circuit called a system LSI or a system on chip (SOC) that is manufactured by the most advanced semiconductor manufacturing process.

Hereinbefore, the invention made by the present inventors has been described in detail on the basis of the embodiments. However, it is needless to say that the invention is not limited thereto, and various modifications can be made in a range not departing from the gist of the invention.

For example, the present moving image encoding processing apparatus is not limited to a configuration in which the encoded bitstream is generated through encoding of the moving image input signal in conformity with a type selected between the current standard H. 264 and the HEVC standard, but there is no limitation thereto.

That is, the present moving image encoding processing apparatus can be applied to a configuration of generating an encoded bitstream in conformity with not only the HEVC standard in which the largest coding unit (LCU) having a size of 64 pixels×64 pixels is set as the maximum processing unit, but also a future standard in which a largest coding unit (LCU) having a size larger than a size of 64 pixels×64 pixels is set as the maximum processing unit.

In addition, as is the case with the frequency transform control unit 120 in FIG. 5, the quantization output control unit 117 in FIG. 2, the motion vector detection control unit 118 in FIG. 3, the intra-prediction control unit 119 in FIG. 4, and the quantization parameter control unit 121 in FIG. 6 can execute the partition operation so that one coding unit (CU) does not simultaneously include a pixel value of the moving image signal VS and a pixel value of the padding processing data PD. As a result, it is possible to reduce the code amount of the encoded bitstream CVBS.

Further, as is the case with the frequency transform control unit 120 in FIG. 5, the filter control unit 122 in FIG. 7 can execute the partition operation so that one coding unit (CU) does not simultaneously include a pixel value of the moving image signal VS and a pixel value of the padding processing data PD. As a result, it is possible to reduce power consumption with respect to the deblocking filter function of the filter unit 107.

INDUSTRIAL APPLICABILITY

The invention is widely applicable to a moving image encoding apparatus that reduces an increase in a code amount of an encoded bitstream during padding processing, and an operation method of the moving image encoding apparatus.

EXPLANATION OF REFERENCE NUMERALS

1: Moving image encoding apparatus
100: Padding processing unit
101: Subtractor
102: Frequency transform unit
103: Quantization unit
104: Inverse quantization unit
105: Inverse frequency transform unit
106: Adder
107: Filter unit 108: Frame memory
109: Motion vector detection unit
110: Motion compensation unit
111: Buffer memory
112: Intra-prediction unit
113: Selector unit
114: Variable length encoding unit
115: Video buffer
116: Quantization output adjustment unit
117: Quantization output control unit
118: Motion vector detection control unit
119: Intra-prediction control unit
120: Frequency transform control unit
121: Quantization parameter control unit
122: Filter control unit

What is claimed is:

1. A moving image encoding apparatus that executes moving image encoding processing of a syntax element relating to a moving image signal that is to be encoded to form an encoded bitstream, the moving image encoding apparatus comprising:
    a padding processing circuit;
    a motion vector detector;
    a motion compensation circuit;
    a subtractor circuit;
    a frequency transform circuit;
    a quantization circuit;
    an inverse quantization circuit;
    an inverse frequency transform circuit;
    a memory;
    an intra-prediction circuit;
    a selector;
    a variable length encoder; and
    a frequency transform control circuit that is connected to the frequency transform circuit,
    wherein the moving image encoding apparatus executes padding processing of adding padding processing data to the moving image signal prior to the moving image encoding processing,
    the horizontal and vertical sizes of an additional moving image signal, to which the padding processing data is added through the padding processing, are set to an integral multiple of an encoded block size in the moving image encoding processing,
    the moving image encoding apparatus determines to which of the moving image signal and the padding processing data an encoded block of the syntax element relating to the moving image signal belongs,
    wherein in a first case where the encoded block of the syntax element relating to the moving image signal is determined to belong to the moving image signal, the moving image encoding processing is controlled so that an encoded bitstream having a first code amount is generated,
    wherein in a second case where the encoded block of the syntax element relating to the moving image signal is determined to belong to the padding processing data, the moving image encoding processing is controlled so that an encoded bitstream having a second code amount is generated, the second code amount being smaller than the first code amount,
    wherein the padding processing circuit executes the padding processing to generate the additional moving image signal, and supplies the additional moving image signal directly to the subtractor circuit, the motion vector detector, and the intra-prediction circuit,
    the motion vector detector generates a motion vector from the additional moving image signal and an inter-reference image that is stored in the memory,
    the motion compensation circuit generates a motion compensation prediction signal in response to the motion vector that is generated from the motion vector detector and the inter-reference image that is stored in the memory,
    the intra-prediction circuit generates an intra-prediction signal from the additional moving image signal and the intra-reference image that is stored in the memory,
    the selector outputs a selection prediction signal that is selected from the motion compensation prediction signal that is generated from the motion compensation circuit, and the intra-prediction signal that is generated from the intra-prediction circuit,
    the additional moving image signal is supplied to one input terminal of the subtractor circuit, the selection prediction signal that is output from the selector is supplied to the other input terminal of the subtractor circuit, and a predictive residual is generated from an output terminal of the subtractor circuit,
    the predictive residual, which is generated from the output terminal of the subtractor circuit, is subjected to frequency transform processing and quantization processing in the frequency transform circuit and the quantization circuit, respectively,
    a result of the frequency transform processing by the frequency transform circuit, which is subjected to the quantization processing in the quantization circuit, is subjected to local decoding processing by the inverse quantization circuit and the inverse frequency transform circuit, and a result of the local decoding processing is stored in the memory as the inter-reference image and the intra-reference image,
    the result of the frequency transform processing by the frequency transform circuit, which is subjected to the quantization processing in the quantization circuit, is subjected to encoding processing by the variable length encoder, and the encoded bitstream is generated from the variable length encoder,
    wherein the syntax element relating to the moving image signal is at least one of information (A) to information (D):
    (A) information of the frequency transform processing by the frequency transform circuit, which is subjected to the quantization processing in the quantization circuit;
    (B) information of an encoded block that is encoded through inter-prediction by using the motion vector and the motion compensation prediction signal;
    (C) information of an encoded block that is encoded through intra-prediction by using the intra-reference image; and
    (D) information of an encoded block that is subjected to quantization processing in the quantization circuit,
    wherein the frequency transform control circuit sets a frequency transform size for the frequency transform processing that is executed in the frequency transform circuit, and
    in response to the frequency transform size that is set by the frequency transform control circuit, a partition operation of the encoded block in the frequency transform circuit is determined so that the encoded block processed by the frequency transform processing executed in the frequency transform circuit does not simultaneously include the moving image signal and the padding processing data, wherein the frequency transform control circuit includes a frequency transform size determination circuit, a non-cross-over frequency transform size determination circuit, an area determination circuit, and a frequency transform size selector, the frequency transform size determination circuit selects one selection frequency transform size from a plurality of kinds of frequency transform size candidates, and supplies the selection frequency transform size that is selected to one input terminal of the frequency transform size selector, the area determination circuit determines whether or not an encoded block having the one selection frequency transform size crosses over a boundary between the moving image signal and the padding processing data, the non-cross-over frequency transform size determination circuit generates a non-cross-over frequency transform size with which the encoded block processed by the frequency transform processing does not cross over the boundary between the moving image signal and the padding processing data, and supplies the non-cross-over frequency transform size that is generated to the other input terminal of the frequency transform size selector, in response to a determination result of the area determination circuit which represents that the encoded block having the one selection frequency transform size does not cross over the boundary, the frequency transform size to the frequency transform circuit as the frequency transforms size for the frequency transform processing, and in response to a determination result of the area determination circuit which represents that the encoded block having the one selection frequency transform size crosses over the boundary, the frequency transform size selector supplies the non-cross-over frequency transform size to the frequency transform circuit as the frequency transform size for the frequency transform processing.

2. The moving image encoding apparatus according to claim 1, further comprising:

a quantization output adjustment circuit that is connected between an output terminal of the quantization circuit, an input terminal of the variable length encoder, and an input terminal of the inverse quantization circuit; and a quantization output control circuit that is connected to the quantization output adjustment circuit, wherein the quantization output control circuit determines to which of the moving image signal and the padding processing data the information of the frequency transform processing by the frequency transform circuit, which is subjected to the quantization processing in the quantization circuit and is the syntax element relating to the moving image signal, belongs, wherein a quantization output signal that is generated through the quantization processing by the quantization circuit, an adjustment signal having a smaller data size than a data size of the quantization output signal, and a determination result that is generated from the quantization output control circuit are supplied to the quantization output adjustment circuit, wherein in response to a determination result of the quantization output control circuit which represents that the information of the frequency transform processing belongs to the moving image signal, the quantization output adjustment circuit supplies the quantization output signal, which is generated from the quantization circuit, to the input terminal of the variable length encoder and the input terminal of the inverse quantization circuit, and in response to a determination result of the quantization output control circuit which represents that the information of the frequency transform processing belongs to the padding processing data, the quantization output adjustment circuit supplies the adjustment signal to the input terminal of the variable length encoder and the input terminal of the inverse quantization circuit.

3. The moving image encoding apparatus according to claim 1, further comprising:

a motion vector detection control circuit that is connected to the motion vector detector, wherein the motion vector detector includes a motion vector search circuit, a prediction vector generation circuit, and a motion vector selector, the motion vector search circuit executes a motion vector search operation with respect to the encoded block, which is included in the additional moving image signal and is encoded through inter-prediction, to generate a search motion vector, the prediction vector generation circuit executes a motion vector prediction method, which is defined in a standard H. 264 or a standard H. 265, with respect to the encoded block which is included in the additional moving image signal and is encoded through inter-prediction to generate a prediction vector, the motion vector detection control circuit determines to which of the moving image signal and the padding processing data the encoded block, which is included in the additional moving image signal, is the syntax element relating to the moving image signal, and is encoded through inter-prediction, belongs, the search motion vector that is generated by the motion vector search circuit, the prediction vector that is generated by the prediction vector generation circuit, and a determination result that is generated from the motion vector detection control circuit are supplied to the motion vector selector, in response to a determination result of the motion vector detection control circuit which represents that the encoded block that is encoded through the inter-prediction belongs to the moving image signal, the motion vector selector supplies the search motion vector that is generated by the motion vector search circuit to the motion compensation circuit as the motion vector, and in response to a determination result of the motion vector detection control circuit which represents that the encoded block that is encoded through the inter-prediction belongs to the padding processing data, the motion vector selector circuit supplies the prediction vector that is generated by the prediction vector generation circuit to the motion compensation circuit as the motion vector.

4. The moving image encoding apparatus according to claim 1, further comprising:

an intra-prediction control circuit that is connected to the intra-prediction circuit, wherein the intra-prediction circuit includes an intra-prediction direction determination circuit, a neighborhood prediction direction generation circuit, a prediction direction selector, and an intra-prediction processing circuit, the intra-prediction direction determination circuit executes an intra-prediction operation with respect to the encoded block, which is included in the additional moving image signal and is encoded through intra-prediction, to generate a prediction direction, the neighborhood prediction direction generation circuit executes a neighborhood direction prediction method that is defined in a standard H. 264 or a standard H. 265 with respect to the encoded block, which is included in the additional moving image signal and is encoded through intra-prediction, to generate a neighborhood prediction direction, the intra-prediction control circuit determines to which of the moving image signal and the padding processing data the encoded block, which is included in the additional moving image signal, is the syntax element relating to the moving image signal, and is encoded through intra-prediction, belongs, the prediction direction that is generated by the intra-prediction direction determination circuit, the neighborhood prediction direction that is generated by the neighborhood prediction direction generation circuit, and a determination result that is generated from the intra-prediction control circuit are supplied to the prediction direction selector, in response to a determination result of the intra-prediction control circuit which represents that the encoded block that is encoded through the intra-prediction belongs to the moving image signal, the prediction direction selector supplies the prediction direction, which is generated by the intra-prediction direction determination circuit, to the intra-prediction processing circuit, the intra-prediction processing circuit generates the intra-prediction signal, which is supplied to the selector, from the prediction direction that is generated by the intra-prediction direction determination circuit, and the intra-reference image that is stored in the memory, in response to a determination result of the intra-prediction control circuit which represents that the encoded block that is encoded through the intra-prediction belongs to the padding processing data, the prediction direction selector supplies the neighborhood prediction direction, which is generated by the neighborhood prediction direction generation circuit, to the intra-prediction processing circuit, and the intra-prediction processing circuit generates the intra-prediction signal, which is supplied to the selector, from the neighborhood prediction direction that is generated by the neighborhood prediction direction generation circuit, and the intra-reference image that is stored in the memory.

5. The moving image encoding apparatus according to claim 1, further comprising:

a quantization parameter control circuit that is connected to the quantization circuit, wherein the quantization parameter control circuit includes a quantization parameter generation circuit, a quantization parameter register, an area determination circuit, and a quantization parameter selector, the quantization parameter generation circuit generates a quantization parameter that corresponds to the code amount of the encoded bitstream that is generated from the variable length encoder, and supplies the quantization parameter that is generated to one input terminal of the quantization parameter selector, and an input terminal of the quantization parameter register, the quantization parameter, which is generated at the output terminal of the quantization parameter register, is supplied to the other input terminal of the quantization parameter selector, the area determination circuit determines to which of the moving image signal and the padding processing data the encoded block, which is the syntax element relating to the moving image signal and is subjected to the quantization processing in the quantization circuit, belongs, in response to a determination result of the area determination circuit which represents that the encoded block that is subjected to the quantization processing in the quantization circuit belongs to the moving image signal, the quantization parameter selector supplies the quantization parameter, which is supplied from the quantization parameter generation circuit to the one input terminal, to the quantization circuit, and in response to a determination result of the area determination circuit which represents that the encoded block that is subjected to the quantization processing in the quantization circuit belongs to the padding processing data, the quantization parameter selector supplies the quantization parameter, which is supplied from the output terminal of the quantization parameter register to the other input terminal, to the quantization circuit.

6. The moving image encoding apparatus according to claim 1, further comprising:

a filter and a filter control circuit which are connected to the memory, wherein the filter executes deblocking filter processing with respect to the result of the local decoding processing that is executed by the inverse quantization circuit and the inverse frequency transform circuit, and stores a result of the deblocking filter processing to the memory, the filter control circuit determines to which of the moving image signal and the padding processing data the result of the local decoding processing, in which the deblocking filter processing by the filter is executed, belongs, in response to a determination result of the filter control circuit which represents that the result of the local decoding processing, in which the deblocking filter processing by the filter is executed, belongs to the moving image signal, the deblocking filter processing by the filter is executed, and in response to a determination result of the filter control circuit which represents that the result of the local decoding processing, in which the deblocking filter processing by the filter is executed, belongs to the padding processing data, the execution of the deblocking filter processing by the filter is stopped.

7. The moving image encoding apparatus according to claim 1, wherein the motion vector detector, the motion compensation circuit, the subtractor circuit, the frequency transform circuit, the quantization circuit, the inverse quantization circuit, the inverse frequency transform circuit, the intra-prediction circuit, the selector, and the variable length encoder are integrated in one semiconductor chip of a semiconductor integrated circuit.

8. The moving image encoding apparatus according to claim 1, wherein the encoded block size in the moving image encoding processing is any one of a macro block having a size of 16 pixels×16 pixels, and a coding unit that can be formed from a largest coding unit having a size of 64 pixels×64 pixels.

9. The moving image encoding apparatus according to claim 1,
wherein the moving image encoding apparatus executes moving image encoding processing of the moving image signal in conformity with a type that is arbitrarily selected from a standard H. 264 and a standard H. 265 to form the encoded bitstream.

10. The moving image encoding apparatus according to claim 1, further comprising:
an image division circuit; and
a plurality of moving image encoding processing circuits,
wherein the image division circuit divides the moving image signal to generate a plurality of divided moving image signals,
the plurality of divided moving image signals, which are generated by the image division circuit, are subjected to parallel processing by the plurality of moving image encoding processing circuits, and
each of the moving image encoding processing circuits of the plurality of moving image encoding processing circuits includes the motion vector detector, the motion compensation circuit, the subtractor circuit, the frequency transform circuit, the quantization circuit, the inverse quantization circuit, the inverse frequency transform circuit, the intra-prediction circuit, the selector, and the variable length encoder.

11. The moving image encoding apparatus according to claim 10,
wherein the image division circuit and the plurality of moving image encoding processing circuits are integrated in one semiconductor chip of a semiconductor integrated circuit.

12. An operation method of a moving image encoding apparatus that executes moving image encoding processing of a syntax element relating to a moving image signal that is to be encoded to form an encoded bitstream,
wherein the moving image encoding apparatus includes a padding processing circuit, a motion vector detector, a motion compensation circuit, a subtractor circuit, a frequency transform circuit, a quantization circuit, an inverse quantization circuit, an inverse frequency transform circuit, a memory, an intra-prediction circuit, a selector, a variable length encoder, and a frequency transform control circuit that is connected to the frequency transform circuit,
wherein the moving image encoding apparatus executes padding processing of adding padding processing data to the moving image signal prior to the moving image encoding processing,
the horizontal and vertical sizes of an additional moving image signal, to which the padding processing data is added through the padding processing, are set to an integral multiple of an encoded block size in the moving image encoding processing,
the moving image encoding apparatus determines to which of the moving image signal and the padding processing data an encoded block of the syntax element relating to the moving image signal belongs,
wherein in a first case where the encoded block of the syntax element relating to the moving image signal is determined to belong to the moving image signal, the moving image encoding processing is controlled so that an encoded bitstream having a first code amount is generated,
wherein in a second case where the encoded block of the syntax element relating to the moving image signal is determined to belong to the padding processing data, the moving image encoding processing is controlled so that an encoded bitstream having a second code amount smaller than the first code amount is generated,
the padding processing circuit executes the padding processing to generate the additional moving image signal, and supplies the additional moving image signal directly to the subtractor circuit, the motion vector detector, and the intra-prediction circuit,
the motion vector detector generates a motion vector from the additional moving image signal and an inter-reference image that is stored in the memory,
the motion compensation circuit generates a motion compensation prediction signal in response to the motion vector that is generated from the motion vector detector, and the inter-reference image that is stored in the memory,
the intra-prediction circuit generates an intra-prediction signal from the additional moving image signal and the intra-reference image that is stored in the memory,
the selector outputs a selection prediction signal that is selected from the motion compensation prediction signal that is generated from the motion compensation circuit, and the intra-prediction signal that is generated from the intra-prediction circuit,
the additional moving image signal is supplied to one input terminal of the subtractor circuit, the selection prediction signal that is output from the selector is supplied to the other input terminal of the subtractor circuit, and a predictive residual is generated from an output terminal of the subtractor circuit,
the predictive residual, which is generated from the output terminal of the subtractor circuit, is subjected to frequency transform processing and quantization processing in the frequency transform circuit and the quantization circuit, respectively,
a result of the frequency transform processing by the frequency transform circuit, which is subjected to the quantization processing in the quantization circuit, is subjected to local decoding processing by the inverse quantization circuit and the inverse frequency transform circuit, and a result of the local decoding processing is stored in the memory as the inter-reference image and the intra-reference image,
the result of the frequency transform processing by the frequency transform circuit, which is subjected to the quantization processing in the quantization circuit, is subjected to encoding processing by the variable length encoder, and the encoded bitstream is generated from the variable length encoder,
wherein the syntax element relating to the moving image signal is at least one of information (A) to information (D):
(A) information of the frequency transform processing by the frequency transform circuit, which is subjected to the quantization processing in the quantization circuit;
(B) information of an encoded block that is encoded through inter-prediction by using the motion vector and the motion compensation prediction signal;
(C) information of an encoded block that is encoded through intra-prediction by using the intra-reference image; and
(D) information of an encoded block that is subjected to quantization processing in the quantization circuit, wherein the moving image encoding apparatus further includes a frequency transform control circuit that is connected to the frequency transform circuit, the frequency transform control circuit sets a frequency transform size for the frequency transform processing that is executed in the frequency transform circuit, and in response to the frequency transform size that is set by the frequency transform control circuit, a partition operation of the encoded block in the frequency transform circuit is determined so that the encoded block processed by the frequency transform processing executed in the frequency transform circuit does not simultaneously include the moving image signal and the padding processing data, wherein the frequency transform control circuit includes a frequency transform size determination circuit, a non-cross-over frequency transform size determination circuit, an area determination circuit, and a frequency transform size selector, the frequency transform size determination circuit selects one selection frequency transform size from a plurality of kinds of frequency transform size from a plurality of kinds of frequency transform size candidates, and supplies the selection frequency transform size that is selected to one input terminal of the frequency transform size selector, the area determination circuit determines whether or not an encoded block having the one selection frequency transform size crosses over a boundary between the moving image signal and the padding processing data, the non-cross-over frequency transform size determination circuit generates a non-cross-over frequency transform size with which the encoded block processed by the frequency transform processing does not cross the boundary between the moving image signal and the padding processing data, and supplies the non-cross-over frequency transform size that is generated to the other input terminal of the frequency transform size selector, in response to a determination result of the area determination circuit which represents that the encoded block having the one selection frequency transform size does not cross over the boundary, the frequency transform size selector supplies the one selection frequency transform size to the frequency transform circuit as the frequency transform size for the frequency transform processing, and in response to a determination result of the area determination circuit which represents that the encoded block having the one selection frequency transform size selector supplies the non-cross-over frequency transform size to the frequency transform circuit as the frequency transform size for the frequency transform processing.

13. The operation method of a moving image encoding apparatus according to claim 12, wherein the moving image encoding apparatus further includes:

a quantization output adjustment circuit that is connected between an output terminal of the quantization circuit, an input terminal of the variable length encoder, and an input terminal of the inverse quantization circuit; and a quantization output control circuit that is connected to the quantization output adjustment circuit, wherein the quantization output control circuit determines to which of the moving image signal and the padding processing data the information of the frequency transform processing by the frequency transform circuit, which is subjected to the quantization processing in the quantization circuit and is the syntax element relating to the moving image signal, belongs, wherein a quantization output signal that is generated through the quantization processing by the quantization circuit, an adjustment signal having a smaller data size than a data size of the quantization output signal, and a determination result that is generated from the quantization output control circuit are supplied to the quantization output adjustment circuit, wherein in response to a determination result of the quantization output control circuit which represents that the information of the frequency transform processing belongs to the moving image signal, the quantization output adjustment circuit supplies the quantization output signal, which is generated from the quantization circuit, to the input terminal of the variable length encoder and the input terminal of the inverse quantization circuit, and in response to a determination result of the quantization output control circuit which represents that the information of the frequency transform processing belongs to the padding processing data, the quantization output adjustment circuit supplies the adjustment signal to the input terminal of the variable length encoder and the input terminal of the inverse quantization circuit.

14. The operation method of a moving image encoding apparatus according to claim 12, wherein the moving image encoding apparatus further includes a motion vector detection control circuit that is connected to the motion vector detector, the motion vector detector includes a motion vector search circuit, a prediction vector generation circuit, and a motion vector selector, the motion vector search circuit executes a motion vector search operation with respect to the encoded block, which is included in the additional moving image signal and is encoded through inter-prediction, to generate a search motion vector, the prediction vector generation circuit executes a motion vector prediction method, which is defined in a standard H. 264 or a standard H. 265, with respect to the encoded block which is included in the additional moving image signal and is encoded through inter-prediction to generate a prediction vector, the motion vector detection control circuit determines to which of the moving image signal and the padding processing data the encoded block, which is included in the additional moving image signal, is the syntax element relating to the moving image signal, and is encoded through inter-prediction, belongs, the search motion vector that is generated by the motion vector search circuit, the prediction vector that is generated by the prediction vector generation circuit, and a determination result that is generated from the motion vector detection control circuit are supplied to the motion vector selector, in response to a determination result of the motion vector detection control circuit which represents that the encoded block that is encoded through the inter-prediction belongs to the moving image signal, the motion vector selector supplies the search motion vector that is generated by the motion vector search circuit to the motion compensation circuit as the motion vector, and in response to a determination result of the motion vector detection control circuit which represents that the encoded block that is encoded through the inter-prediction belongs to the padding processing data, the motion vector selector supplies the prediction vector that is generated by the prediction vector generation circuit to the motion compensation circuit as the motion vector.

15. The operation method of a moving image encoding apparatus according to claim 12, wherein the moving image encoding apparatus further includes an intra-prediction control circuit that is connected to the intra-prediction circuit, the intra-prediction circuit includes an intra-prediction direction determination circuit, a neighborhood prediction direction generation circuit, a prediction direction selector, and an intra-prediction processing circuit, the intra-prediction direction determination circuit executes an intra-prediction operation with respect to the encoded block, which is included in the additional moving image signal and is encoded through intra-prediction, to generate a prediction direction, the neighborhood prediction direction generation circuit executes a neighborhood direction prediction method that is defined in a standard H. 264 or a standard H. 265 with respect to the encoded block, which is included in the additional moving image signal and is encoded through intra-prediction, to generate a neighborhood prediction direction, the intra-prediction control circuit determines to which of the moving image signal and the padding processing data the encoded block, which is included in the additional moving image signal, is the syntax element relating to the moving image signal, and is encoded through intra-prediction, belongs, the prediction direction that is generated by the intra-prediction direction determination circuit, the neighborhood prediction direction that is generated by the neighborhood prediction direction generation circuit, and a determination result that is generated from the intra-prediction control circuit are supplied to the prediction direction selector, in response to a determination result of the intra-prediction control circuit which represents that the encoded block that is encoded through the intra-prediction belongs to the moving image signal, the prediction direction selector supplies the prediction direction, which is generated by the intra-prediction direction determination circuit, to the intra-prediction processing circuit, the intra-prediction processing circuit generates the intra-prediction signal, which is supplied to the selector, from the prediction direction that is generated by the intra-prediction direction determination circuit, and the intra-reference image that is stored in the memory, in response to a determination result of the intra-prediction control circuit which represents that the encoded block that is encoded through the intra-prediction belongs to the padding processing data, the prediction direction selector supplies the neighborhood prediction direction, which is generated by the neighborhood prediction direction generation circuit, to the intra-prediction processing circuit, and the intra-prediction processing circuit generates the intra-prediction signal, which is supplied to the selector, from the neighborhood prediction direction that is generated by the neighborhood prediction direction generation circuit, and the intra-reference image that is stored in the memory.

* * * * *